United States Patent [19]

Nishiyama et al.

[11] Patent Number: 4,866,655
[45] Date of Patent: Sep. 12, 1989

[54] ARITHMETIC PROCESSOR AND DIVIDER USING REDUNDANT SIGNED DIGIT

[75] Inventors: Tamotsu Nishiyama; Shigeo Kuninobu, both of Osaka; Naofumi Takagi, Kyoto; Takashi Taniguchi, Osaka, all of Japan

[73] Assignee: Matsushita Electric Industrial Co., Ltd., Osaka, Japan

[21] Appl. No.: 74,892

[22] Filed: Jul. 17, 1987

Related U.S. Application Data

[63] Continuation-in-part of Ser. No. 66,817, Jun. 25, 1987, and Ser. No. 70,565, Jul. 7, 1987.

[30] Foreign Application Priority Data

Jul. 18, 1986 [JP] Japan .................................. 61-170004
Aug. 19, 1986 [JP] Japan .................................. 61-193205
Oct. 14, 1986 [JP] Japan .................................. 61-243440

[51] Int. Cl.$^4$ .............................................. G06F 7/49
[52] U.S. Cl. ..................... 364/761; 364/768; 341/93
[58] Field of Search ............... 364/761, 766, 767, 768; 341/93

[56] References Cited

U.S. PATENT DOCUMENTS 3,803,393  4/1974  Wang .................................... 364/766
4,623,872  11/1986 Rainer .................................... 341/93

OTHER PUBLICATIONS

Arizienis, "Binary-Compatible Signed-Digit Arithmetic", *Proceedings—Fall Joint Computer Conference*, 1964, pp. 663–672.
Tung, "Division Algorithm for Signed-Digit Arithmetic", *IEEE Trans. on Computers*, Sep. 1968, pp. 887–889.
Atkins, "Design of the Arithmetic Units of Illiac III: Use of Redundancy & Higher Radix Methods", *IEEE Trans. on Computers*, vol. C-19, No. 8, Aug. 1970, pp. 720–733.
A VLSI-Oriented High-Speed Divider Using Redundant Binary Representation, Takagi et al., IECE Japan, vol. 167 D, #4, pp. 450–457, 4/84.
A VSLI-Oriented High-Speed Multiplier Using Redundant Binary Adder Tree, Takagi et al., IECE Japan, vol. J66.d, pp. 683–690, 6/84.
A New Class of Digital Division Methods, James Robertson, IRE Transactions on Electronic Computers, pp. 218–222, 9/58.
Signed-Digit Number Representations for Fast Parallel Arithmetic, Avizienis, IRE Transactions on Electronic Computers, pp. 389–400, 9/61.

(List continued on next page.)

*Primary Examiner*—David H. Malzahn
*Attorney, Agent, or Firm*—Amster, Rothstein & Ebenstein

[57] ABSTRACT

An arithmetic processor is disclosed for performing arithmetic operations utilizing an arithmetic operand represented by a signed digit expression having a plurality of digits which may have a positive, zero or negative value. The processor comprises: first circuitry coupled to receive a signal related to the most significant digit of a signed digit expression number Y having nonnegative (or nonpositive) digits other than the most significant digit, and for providing in response to a control signal, a signal representing the logical negation or inversion of the sign of the most significant digit; second circuitry coupled to receive at least one signal related to digits other than the most significant digit of the number Y, and for providing in response to a control signal, at least one signal representing the logical negation or inversion of those digits; and third circuitry coupled to receive a signal related to the least significant digit of the number Y, and for providing in response to a control signal, a signal representing the least significant digit plus 1 (or minus 1). The first and second circuitry invert the signs of the digits of the number Y, and the third circuitry adds (or subtracts) 1 from the least significant digit. The processor also includes circuitry coupled to receive the signals provided by the first, second and third circuitry and a signal representing a number X, and providing a signal representing the sum or difference of the numbers X and Y depending on the control signal.

23 Claims, 9 Drawing Sheets

OTHER PUBLICATIONS

A Class of Binary Divisions Yielding Minimally Represented Quotients, Metze, IRE Transactions on Electronic Computers, pp. 761–764, 12/62.

Multiple Operand Addition and Multiplication, Shanker Singh et al., IEEE Transactions on Computers, vol. C–22, No. 2, pp. 113–120, 2/73.

Concise Papers, Lyon, IEEE Transactions on Communications, pp. 418–425, 4/76.

Real-Time Processing Gains Ground with Fast Digital Multiplier, Waser, et al., Electronics, pp. 93–99, 9/77.

High Speed Multiplier Using A Redundant Binary Adder Tree, Harata et al., IEEE International Conference on Computer Design, pp. 165–170, 1984.

High Speed VLSI Multiplication Algorithm with a Redundant Binary Addition Tree, Takagi et al., IEEE Transactions on Computers, vol. C–34, No. 9, pp. 1789–1795, 9/85.

Design of High Speed MOS Multiplier and Divider Using Redundant Binary Representation, Kuninobu et al., Proceedings 8th Symposium on Computer Arithmetic, pp. 80–86, 5/87.

ARITHMETIC PROCESSOR AND DIVIDER USING REDUNDANT SIGNED DIGIT

RELATED APPLICATIONS

This is a continuation-in-part of application Ser. No. 066,817 filed June 25, 1987 entitled "Arithmetic Processor using redundant Signed Digit Arithmetic", and application Ser. No. 070,565 filed July 7, 1987 entitled "Arithmetic Processor And Divider Using Redundant Signed Digit Arithmetic", the disclosures of which are incorporated herein by reference.

BACKGROUND OF THE INVENTION

The present invention relates to an arithmetic processor and, more particularly, to a high speed arithmetic processor utilizing addition, subtraction and sign inversion for performing arithmetic operations, which may be implemented by LSI.

A high speed multiplier is discussed on pp. 683 to 690 of *Trans. of IECE Japan*, Vol. J66-D, No. 6 (1983). A high speed divider is discussed on pp. 450 to 457 of *Trans. of IECE Japan*, Vol. J67-D, No. 4 (1984). These arithmetic units execute multiplication or division by means of combinational circuitry using a redundant binary expression (i.e., a kind of signed digit ("SD") expression) in which each digit is represented by a set of elements $\{-1, 0, 1\}$.

For example, a prior art divider is implemented by combinational circuitry using ECL (Emitter-Coupled-Logic) 4-input NOR/OR gates based on shift, subtract, restore division using the redundant binary expression. While that prior art divider has faster arithmetic processing speeds and has a regular array structure, no consideration has been given to factors such as a reduction in the number of transistors required and implementation by other circuitry (e.g., CMOS).

Dividers in wide use today are sequential circuits each having a subtracter (adder) and a shifter. However, it is well known that as the number of digits of the operands increases, an exceedingly long time is required for those dividers to perform arithmetic operations. On the other hand, large-size computers having high-speed multipliers often employ multiplication-type division in which division is performed by repetition of multiplication. However, implementation of such multiplication type division by combinational circuitry requires large numbers of hardware elements, and is therefore impractical.

With respect specifically to a high-speed arithmetic unit employing signed digit numbers for arithmetic operations, it has been proposed to carry out an arithmetic operation such as multiplication or division with combinational circuitry by utilizing an ECL logic element that enables NOR and OR operations to be simultaneously performed. However, little consideration has been given to reducing the number of transistors required, to implementation of that unit using other types of circuitry, and to differences in the arithmetic operation times (i.e., the number of transistor gates in the computing path) of the multiplier, divider or an ALU, and, therefore, the following problems are associated with that high-speed arithmetic unit:

(1) as the number of digits of the operands increases, the number of gates required increases which makes it difficult to fabricate a multiplier and an ALU on a single VLSI chip;

(2) if the subtracter, the ALU and the multiplier of the arithmetic processor utilize a number of common clocks, processing time for addition/subtraction or multiplication is increased.

OBJECTS AND SUMMARY OF THE INVENTION

It is an object of the present invention to provide a high-speed arithmetic processor which can readily be fabricated compactly on an LSI chip.

It is another object of the present invention to provide such a high-speed arithmetic processor utilizing combinational circuitry in which signed digit numbers are employed for internal addition and subtraction.

It is another object of the present invention to provide a high-speed arithmetic processor which adopts an array structure and in which the number of required elements (transistors) is substantially reduced (e.g., by half) as compared to prior art high-speed arithmetic processors.

It is another object of the present invention to provide such a high-speed arithmetic processor which minimizes the number of digits which need carry propagation for internal addition and subtraction (e.g., one digit at most).

Divider Using Redundant Signed Digit", It is another object of the present invention to provide a high-speed arithmetic processor which is of simplified circuit configuration.

It is another object of the present invention to provide an arithmetic addition/subtraction circuit or unit for use in a high-speed arithmetic processor.

In accordance with the invention, an arithmetic processing unit is provided for performing arithmetic operations utilizing an arithmetic operand represented by a signed digit expression of radix r having a plurality of digits which may have a positive, zero or negative value. The processing unit comprises: first means coupled to receive a signal related to the most significant digit of a signed digit expression number Y whose digits other than the most significant digit are either non-negative (or non-positive), and for providing a signal representing the sign inversion of the most significant digit as $-y_{n-1}$ minus 1 modulo r (i.e. $-y_{n-1} - 1 \pmod{r}$), (or, in the case where the digits other than the most significant digit of y are non-positive, representing the sign inversion of the most significant digit as $-y_{N-1} + 1$ plus 1 modulo r (i.e. $-y_{n-1} + 1 \pmod{r}$)); second means coupled to receive at least one signal related to digits other than the most significant digit of the number Y, and for providing at least one signal representing the $(r-1)$'s complement of the digit $y_i$ (i.e. $(r-1) - y_i$), (or, in the case where the digits other than the most significant digit of y are non-positive, the $-(r-1)$'s complement of the digit $y_i$ (i.e. $-(r-1) - y_i$)), where, in the case of radix 2, the digits $(r-1) - y_i$ are the logical negation of the digits $y_i$; and third means coupled to receive a signal related to the least significant digit of the number Y, and for providing a signal representing the least significant digit plus 1 (or minus 1). The first and second means invert the signs of the digits of the number Y, and the third means adds (or subtracts) 1 from the least significant digit.

The first, second and third means each are further coupled to receive a control signal and provide their respective signals in accordance with the control signal. According to a specific embodiment, the first means provides a signal representing 0 if the most significant digit is −1 or 1, or a signal representing 1 if the most significant digit is 0. According to a preferred embodiment, the first means comprises an exclusive OR gate, one input of which receives a signal representing the most significant digit of the number Y (as the signal related to the most significant digit), another input of which receives a control signal, and an output of which provides the signal representing the sign inversion of the most significant digit as $-y_{n-1}$ minus 1 modulo r (i.e. $-y_{n-1}-1 \pmod r$)) (or, in the case where the digits other than the most significant digits of y are non-positive, representing the sign inversion of the most significant digit as $-y_{n-1}$ plus 1 modulo r (i.e. $-y_{n-1}+1 \pmod r$)). second means converts a logical 1 signal to a logical 0, and a logical 0 signal to a logical 1 signal and comprises at least one exclusive OR gate, one input of which receives a signal representing a digit other than the most significant digit of the number Y (as the at least one signal related to the digits other than the most significant digit), another input of which receives a control signal and an output of which provides the at least one signal representing the logical negation of the digits. The third means receives a signal representing the least significant digit (as the signal related to the least significant digit) and a control signal.

The processor also includes means coupled to receive the signals provided by the first, second and third means and a signal representing a number X, and for providing a signal representing the sum or difference of the numbers X and Y depending on the control signal.

Further in accordance with the invention, the arithmetic processor is capable of performing shift-subtract restoring division using a signed digit expression. More specifically, the processor comprises means coupled to receive a signal related to a partial remainder X represented by a signed digit expression, and for providing a signal representing a quotient digit q also represented by a signed digit expression; conversion means coupled to receive a signal related to divisor Y represented by a signed digit expression and the signal representing the quotient digit q, and for providing a signal representing Y, −Y or O depending upon the signal representing the quotient digit q; and addition/subtraction means coupled to receive the signal related to the partial remainder X and the signal representing Y, −Y or O, and for adding (or subtracting) those signals. The addition/subtraction means may comprise the first, second and third means referred to above. In accordance with a specific embodiment, the divisor Y is a binary expression number.

Still further in accordance with the invention, another embodiment of an arithmetic processor is provided comprising: a plurality of quotient determining means for determining the digits of a quotient, and a plurality of partial remainder determining means for determining a partial remainder after the digits of the quotient have been determined. The quotient determining means and the partial remainder determining means each comprise a plurality of circuits or gates. A memory means for a partial remainder is provided for storing the partial remainder which has been determined by the lowest stage circuit of the partial remainder determining means, whereby the partial remainders stored in the memory means for a partial remainder are input at different times to the highest stage circuit of the quotient determining means such that the circuits of the quotient determining means are used repeatedly to thereby provide a quotient having a number of digits larger than the number of circuits or gates. Furthermore, quotient memory means are provided in order to retain each digit of the quotient during the plural number of repetitions.

In accordance with this embodiment of the invention, the partial remainder determined by the partial remainder determining circuits for the least significant (i.e. m-th) digit is stored in a quotient memory means for a partial remainder; m digits of the quotient are stored in this manner in the quotient memory. Those partial remainders are input to the highest stage quotient determining cell and partial remainder determining circuit at different times in response to different clocks. The identical combinational circuit (i.e., the quotient determining circuit and a partial remainder determining circuit of m stages) is used so that hardware can be reduced drastically (i.e. to about one L-th). In the arithmetic processor equipped with a multiplier and a divider, on the other hand, the machine cycle is delayed so that the arithmetic processing time for multiplication is lengthened to be the same as that for division, when both the multiplier and the divider are operated in response to one clock. Since, however, division can be executed by L clocks and m circuits, processing time for division is shortened, and, at the same time, multiplication time should not be lengthened since the machine cycle need not conform to the processing time of the multiplier.

Addition and subtraction as described above may be used in accordance with the invention to carry out internal arithmetic operations including multiplication, division, addition and subtraction, and such addition and subtraction may be described using the signed digit expression (hereinafter referred to as "SD expression") in which each digit is expressed by one of the following elements: zero, a positive integer; and a negative integer corresponding to the positive integer. In the SD expression, each digit is expressed by any of the following elements: $\{-1, 0, 1\}$; $\{-2, -1, 0, 1, 2\}$; $\{-N, \ldots, -1, 0, 1, \ldots, N\}$, etc., whereby redundancy is provided so that one number can be expressed in a plurality of different ways. An intermediate carry (or borrow) and an intermediate sum (or difference) digit may be determined so that the final sum (or difference) of the intermediate sum (or difference) digit and the intermediate carry (or borrow) from the next lower order digit may be obtained within a single digit even if a lower-order digit is carried or borrowed. This makes it possible to prevent borrow (or carry) propagation in subtraction (or addition) and thus enables parallel subtraction (or addition) to be executed by the combinational circuitry within a predetermined time irrespective of the number of digits of the operands. For example, in the SD expression in which each digit is expressed in an element set $\{-1, 0, 1\}$, it is possible to prevent carry (or borrow) propagation in addition (or subtraction) from occurring at more than one digit. This is described in, for example, Trans of IECE Japan, Vol. J67-D, No. 4, 1984, pp. 450 to 457 and in Trans of IECE Japan, Vol. J66-D, No. 6, 1983, pp. 683 to 690.

For arithmetic operations such as multiplication, division, addition or subtraction, it is possible to simplify circuit structure by using the addition or subtraction of a number expressed in the SD expression (i.e., a redundant binary number) and a number expressed in the SD expression having nonnegative digits (i.e., a binary number).

The following description is directed especially to addition or subtraction, in Which: an augend (or dividend) is a redundant binary number X; an addend (or divisor) is a binary number Y; and a sum or difference (i.e., the arithmetic result of the addition or subtraction) is a redundant binary number.

In the addition of a redundant binary number and a binary number, according to an algorithm having only one carry propagation digit, an intermediate sum digit is determined in accordance with Table 1, and an intermediate carry is determined in accordance with Table 2:

TABLE 1

|  |  | Augend (Redundant Binary) | | |
|---|---|---|---|---|
|  |  | −1 | 0 | 1 |
| Addend | 0 | −1 | 0 | −1 |
| (Binary) | 1 | 0 | −1 | 0 |

TABLE 2

|  |  | Augend (Redundant Binary) | | |
|---|---|---|---|---|
|  |  | −1 | 0 | 1 |
| Addend | 0 | 0 | 0 | 1 |
| (Binary) | 1 | 0 | 1 | 1 |

According to the present invention, the sign inversion $-y$ of either a redundant binary number $Y = \{y_{n-1}\ y_{n-2}\cdots y_1\ y_0\}_{SD2}$ having its most significant digit nonpositive and all the remaining digits nonnegative, or a binary number $Y = \{y_{n-1}\ y_{n-2}\cdots y_1\ y_0\}_2$ in the 2's complement expression, can be expressed by adding 1 to a redundant binary number $\{w_{n-1}\ \bar{y}_{n-2}\cdots \bar{y}_1\ \bar{y}_0\}_{SD2}$ (which is obtained by the first means and the second means referred to above) having nonnegative digits other than the most significant digit, i.e., by:

$$\{w_{n-1}\ \bar{y}_{n-2}\cdots \bar{y}_1\ \bar{y}_0\}_{SD2} 1$$

which result is obtained by the third means referred to above where $w_{n-1}$ is equal to $-y_{n-1}-1$ and $\bar{y}_i$ is equal to $1-y_i$. The value of $w_{n-1}$ is 0 for $y_{n-1}=1$ or $-1$; and the value of $w_{n-1}$ is $-1$ for $y_{n-1}0$. Moreover, $\bar{y}_i$ is the logical negation (i.e., 1 is the logical negation of 0, and 0 is the logical negation of 1) of $y_i$.

Therefore, subtraction between X and Y can be expressed in the form of addition of $-Y$ so that subtraction of $x_i - y_i$ of each digit can be expressed in the form of addition of the minuend $x_i$ and the logical negation $\bar{y}_i$ of the subtrahend. In other words, the subtrahend can be obtained in an adder by taking the logical negation of each digit of the subtrahend. For the most and least significant digits, however, further processing is required. Thus, addition or subtraction of a redundant binary number and a binary number can be performed by an adder to simplify circuit structure.

Redundant addition and subtraction of a redundant binary number and a binary number has been described above. Shift, subtract, restore division employing the redundant addition/subtraction described above will be described next.

The shift-subtract restoring division method is generally expressed by the following recurrence formula:

$$R^{(j+1)} = r \times R^{(j)} - q^j \times D,$$

where:
 j is the exponent of the recurrence formula;
 r is a radix;
 D is a divisor;

$q^j$ is the j-th decimal digit from a decimal point of the quotient;
 $r \times R^{(j)}$ is a partial dividend before $q^j$ is determined; and
 $R^{(j+1)}$ is a partial remainder after $q^j$ is determined.

Thus, the divider can be realized in the form of combinational circuitry by providing, for each exponent j of the recurrence formula, a quotient-determining circuit for determining the quotient $q_j$ and a partial remainder determining circuit which subtracts or does not subtract D from $r \times R^{(j)}$ in accordance with the value of $q_j$. In internal arithmetic operations, moreover, an internal operand may be expressed using the SD expression.

A high-speed divider may be implemented by using the SD expression for the arithmetic applications described above. If the mantissa of a floating decimal point, i.e., the signless binary number X having an integer part of 1 bit and a decimal part of n bits, is expressed using the SD expression of radix 2 (i.e., the redundant binary expression), then the number X below represents the value of $$\sum_{i=0}^{n} x_i \times 2^{-i}:$$

$$X = (x_0 \cdot x_1 \ldots x_n)_{SD2}.$$

However, each digit $x_i$ is expressed as elements in the set $\{-1, 0, 1\}$. If, in that case, the divisor D and each partial remainder $R^{(j)}$ are expressed in the radix-2 SD expression in the recurrence formula given above, it is necessary to add or subtract D in accordance with the value of $q^j$ in such a manner that, when $q^j = -1$, $R^{(j)}$ is shifted leftward by one digit and D is added; when $q^j = 0$, $R^{(j)}$ is shifted leftward by one digit; and when $q_j = 1$ R(j) is shifted leftward by one digit and D is subtracted.

According to the present invention, conversion means (referred to above) responsive to a control signal determined by the quotient $q^j$, converts the divisor D into either D, an SD expression number $\bar{D}$ having sign-inverted nonnegative digits other than the most significant digit, or 0, i.e., into $D^{(j)}$ determined by the following equation:

$$D^{(j)} = \begin{cases} D & \text{(for } q^j = -1) \\ 0 & \text{(for } q^j = 0) \\ \bar{D} & \text{(for } q^j = 1) \\ \text{where } \bar{D} \text{ is a sign-inverted expression of } D. \end{cases}$$

The partial remainder referred to above is determined by the following equation in the addition/subtraction means referred to above:

$$R^{(j+1)} = 2 \times R^{(j)} + D^{(j)}.$$

Therefore, addition/subtraction or the digit shifting used in determining the partial remainder in division can be performed by addition (i.e., in the addition/subtraction means referred to above) of the SD expression number and the SD expression number having nonnegative digits (binary number) such that a simple circuit (e.g., the conversion means referred to above) may be used. This makes it possible to drastically reduce the hardware required in a high speed array and to simplify circuit construction.

DETAILED DESCRIPTION OF THE INVENTION

FIGS. 1-5 depict an embodiment of a shift-subtract restoring division unit which operates on signless binary numbers of normalized n digits, specifically a 2's complement binary number.

Figure 1:
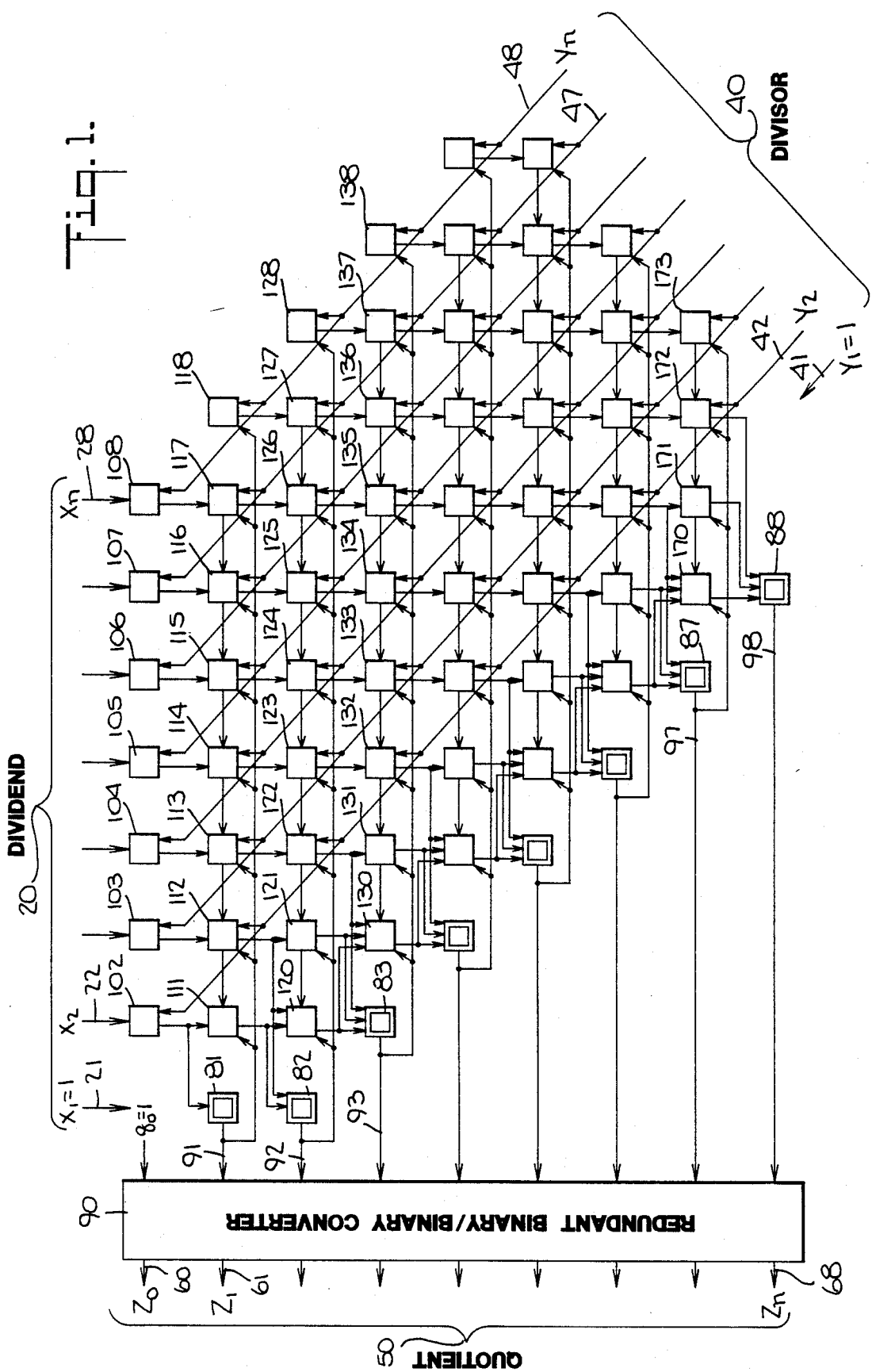
FIG. 1 is a block diagram of an arithmetic processor according to one embodiment of the present invention.

Referring to FIG. 1, which is a block diagram corresponding to the case of n=8, a dividend 20 represented by $\{D \cdot x_1 \, x_2 \text{---}, x_n\}_2$ and a divisor 40 represented by $\{D_{y1} \, y_2 \text{---}, y_n\}_2$ are input to the division unit depicted in FIG. 1. Specifically, signals 21, 22, - - - , 28 corresponding respectively to the values of the first ($X_1$), second ($X_2$), - - - , n-th ($X_n$) decimal digits from the decimal point are input as dividend 20, and signals 41, 42 - - - , 48 corresponding respectively to the first ($Y_1$), second ($Y_2$), - - - , n-th ($Y_n$) decimal digits from the decimal point are input as divisor 40. In response to dividend 20 and divisor 40, the division unit outputs a quotient 50 represented by $\{D \cdot z_1 \, z_2 \text{---}, z_n\}_2$. Quotient 50 is in the form of an integer ($Z_0$), and first ($Z_1$), second ($Z_2$), - - - , n-th ($Z_n$) decimal digits from the decimal point represented by signals 60, 61, - - - , 68, respectively.

Blocks 102, 103, - - - , 173 are redundant addition/subtraction cells for radix-2 SD expression numbers (which will be referred to herein as the "redundant binary numbers") and binary numbers. The following are individual partial remainder determining circuits: the circuit composed of the blocks 102, 103, - - - , 108; the circuit composed of the blocks 111, 113, - - - , 118; the circuit composed of the blocks 120, 121, - - - , 128; the circuit composed of the blocks 130, 131, - - - , 138; and the circuit composed of the blocks 170, 171, 172 and 173. In each of those individual partial remainder determining circuits, the partial remainder $R^{(j+1)}$ after the j-th digit of the quotient has been determined is determined from the output $R^{(j)}$ of a next higher stage partial remainder determining circuit (e.g., (j−1)th circuit) and the value $q^j$ of the j-th digit of the quotient.

Blocks 81, 82, 83, - - - , 87, 88 are quotient determining cells, each of which receives the partial remainder $R^{(j)}$ from the output of the partial remainder determining circuit adjacent hereto (e.g., the (j−1)th circuit) and determines the value $q^j$ of the j-th decimal digit from the decimal point of the quotient expressed in the redundant binary expression. Quotient determining cells output the respective values of $q^j$ as signals 91, 92, 93, - - - , 97, 98.

Block 90 is a redundant binary/binary converter which receives signals 91, 92, 93, - - - , 97, 98, representing the individual digits of quotient Q expressed in the redundant binary expression and outputs signals 60, 61, - - - , 68 representing the individual digits $Z_0, Z_1, \text{---}, Z_n$ of the quotient in the binary expression. This redundant binary/binary converter 90 is a circuit for subtracting a signless binary number $Q^-$, obtained by setting the "−1" digits of the quotient Q in the redundant binary expression to "1", from a signless binary number $Q^+$ obtained by setting the "1" digits of the quotient Q in the redundant binary expression to "1". Converter 90 can easily be implemented by a conventional ripple-carry addition unit or a conventional carry look ahead addition unit.

In FIG. 1, for integer values of j within the range n/2<j<n−1, the redundant addition cells for the {2×(n−j+1)}th digit from the decimal point and lower digits are omitted from the partial remainder determining circuit at the j-th step to reduce hardware requirements. On the other hand, the highest stage partial remainder determining circuits 102, - - - , 107, 108 determine each digit of the redundant binary number using the subtraction of each digit of binary numbers.

The following description is applicable to the redundant addition/subtraction cells 111, 112, 113, - - - , 173. After the j-th decimal digit $q^j$ from the decimal point of the quotient and the partial remainder $R^{(j)}$ have been determined, the partial remainder may be determined from the following recurrence formulas:

$$R^{(j+1)} = 2 \times R^{(j)} + D^{(j)};$$

and $$D^{(j)} = \begin{cases} (0.y_1 \, y_2 \ldots y_n)_2 & \text{(for } q^j = -1) \\ 0 & \text{(for } q^j = 0) \\ (0.\overline{y_1} \, \overline{y_2} \ldots \overline{y_n})_2 & \text{(for } q^j = 1), \end{cases}$$

where $\overline{y_i}$ is the logical negation of $y_i$. This determination makes use of the fact that sign inversion of $\{0.y_1 \, y_2 \text{---} y_n\}_2$ may be accomplished using a 2's complement.

In the above recurrence formulas, $2 \times R^{(j)}$ is determined by shifting $R^{(j)}$ leftward by one digit. $R^{(j+1)}$ is determined by executing for each digit $r_{i+1}^j$ from the decimal point of $R^{(j)}$ and $y_i$ for $q^j = -1$; redundant addition of $r_{i+1}^j$ and 0 for $q^j = 0$; and redundant addition of $r_{i+1}^j$ and $\overline{y_i}$ for $q^j = 1$.

In order to execute redundant addition between the redundant binary number and the binary number such that a one-digit carry is propagated, in accordance with the invention, the intermediate sum digit is determined in accordance with Table 1, and the intermediate carry is determined in accordance with Table 2.

Conversion of a redundant binary number into a binary number is achieved as follows. One digit $r_i{}^j$ in the redundant binary number representing a remainder number is expressed by 2-bits, $r_{is}{}^j$ and $r_{id}{}^j$, and the values $-1$, $0$ and $1$ are expressed as 2-bit binary signals 11, 10 and 01, respectively. One bit $q^j$ of the redundant binary number representing the quotient is expressed by 2-bits $q_+{}^j$ and $q_-{}^j$, and the values $-1$, 0 and 1 are expressed by 2-bit binary signals 01, 00 and 10, respectively.

The i-th digit $d_i{}^j$ of the second term $D^{(j)}$ of the above recurrence formulas, intermediate sum digit $S_i{}^j$ and intermediate carry $C_i{}^j$ may be determined by the following logical equations:

$$d_i = q_+{}^j + y_i + q_-{}^j \cdot y_i;$$

$$S_i = r_{i+1d}{}^j \oplus d_i{}^j; \text{ and}$$

$$C_i{}^j = \overline{r_{i+1s}{}^j} + \overline{r_{i+1d}{}^j} \cdot d_i{}^j.$$

The final sum $r_i{}^{j+1}$ is given by the 2-bit signal expressed by the following equations:

$$r_{is}{}^{j+1} = S_i{}^j + \overline{C_{i+1}{}^j}; \text{ and}$$

$$r_{id}{}^{j+1} = S_i{}^j + C_{i+1}{}^j,$$

where i designates an integer from 1 to $n-1$. The term $r_n{}^{j+1}$ and the intermediate carry $C_n{}^j$ in the n-th digit decimal from the decimal point are given by the following equations:

$$r_{ns}{}^{j-1} = \overline{q_-{}^j} + \overline{Y_n};$$

$$r_{nd}{}^{j+1} = (q_+{}^j + q_-{}^j) \cdot y_n; \text{ and}$$

$$C_n{}^j = q_+{}^j.$$

Moreover, $S_0{}^j$ and $r_0{}^{j+1}$ are given by the following logical equations:

$$S_0{}^j = r_{1d}{}^j \oplus q_+{}^j;$$

$$r_{0s}{}^{j+1} = \overline{q_+{}^j} + (r_{0s}{}^j + r_{1d}{}^j) \cdot (r_{2s}{}^j + \overline{r_{1d}{}^j}); \text{ and}$$

$$r_{0d}{}^{j+1} = S_0{}^j \oplus C_1{}^j.$$

In the above logical equations: symbols 37 ".", "+" and "⊕" designate operators representing the logical product (AND), the logical sum (OR) and the exclusive logical sum (EX-OR), respectively; and $q_-{}^{-j}$, $d_n{}^{-j}$ and $r_{1d}{}^j$ designate the logical inverses or negations of $q_-{}^j$, $d_n{}^j$ and $r_{1d}{}^j$, respectively.

Figure 2:
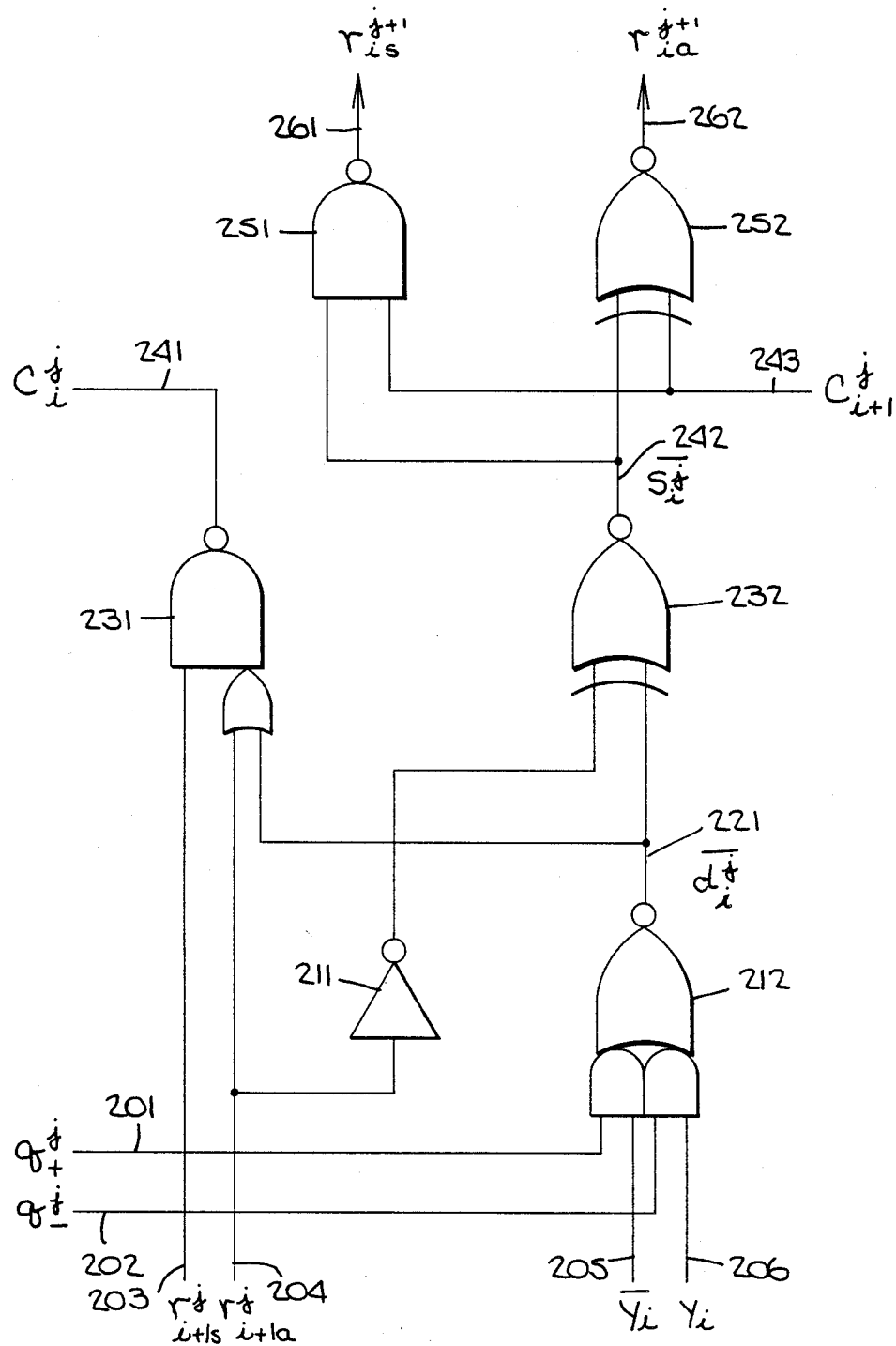
FIG. 2 is a circuit diagram of a redundant addition/subtraction cell of the arithmetic processor of FIG. 1 for addition/subtraction of an intermediate digit.

FIG. 2 is a circuit diagram of an embodiment of the redundant addition/subtraction cells 111, - - -, 117, 121, - - -, 127, 131, - - -, 171, - - -, 172 and 173 of FIG. 1 for intermediate digits In FIG. 2, gate 211 is an inverter; gate 212 is an AND-NOR composite gate; gate 231 is an OR-NAND composite gate; gates 232 and 252 are exclusive NOR gates; and gate 251 is a NAND gate. Signals 201 ($q_+{}^j$) and 202 ($q_-{}^j$) are any of the 2-bit signals 91, 92, - - -, 97 representing the j-th decimal digit $q^j$ from the decimal point of the quotient in FIG. 1. Signals 203 ($r_{i+1s}{}^j$) and 204 ($r_{i+1d}{}^j$) are 2-bit signals representing the (i+1)th decimal digit $r_{i+1}{}^j$ from the decimal point of the partial remainder (after the (j-1)th decimal digit $q^{j-1}$ from the decimal point of the quotient has been determined). Signal 206 ($y_i$) is any of the 1 bit signals 41, 42, - - - and 47 representing the i-th decimal digit from the decimal point of the divisor. Signal 205 ($\bar{y}_i$) is a signal representing the logical negation or inverse of the signal $y_i$. Signal 221 ($\bar{d}_i{}^{-j}$) is a 1 bit signal representing the logical negation of the i-th decimal digit from the decimal point of an addend $D^{(j)}$. Signal 241 ($C_i{}^j$) is a 1-bit signal representing the intermediate carry of the i-th decimal digit from the decimal point. Signal 242 ($\bar{S}_i{}^{-j}$) is a 1-bit signal representing the logical negation of the intermediate sum digit of the i-th decimal digit from the decimal point. Signal 243 ($C_{i+1}{}^j$) is a 1-bit signal representing the intermediate carry of the (i+1)th decimal digit from the decimal point. Output signals 261 ($r_{is}{}^{j+1}$) and 262 ($r_{id}{}^{j+1}$) are 2-bit signals representing the i-th decimal digit $r_i$ from the decimal point of the partial remainder after the j-th decimal digit $q^j$ from the decimal point of the quotient has been determined.

In FIG. 2, the inverter 211, the exclusive NOR gate 232, the OR NAND composite gate 231, the NAND gate 251 and the exclusive NOR gate 252 comprise an addition circuit for the redundant binary number and the binary number. The circuit composed of the NAND gate 251 and the exclusive NOR gate 252 determines, from the intermediate carry signal 243 ($C_{i+1}{}^j$) of a lower order digit and signal 242 representing the logical negation $\bar{S}_i{}^{-j}$ of the intermediate sum digit $S_i{}^j$ output by exclusive NOR gate 232, the final sum represented by 2-bit output signal 261 ($r_{is}{}^{j+1}$) and 262 ($r_{id}{}^{j+1}$). The means for converting the i-th decimal digit $y_i$ from the decimal point of the divisor into $y_i$, 0 or $\bar{y}_i$ in accordance with the value of the j-th digit decimal from the decimal point of the quotient is implemented by AND-NOR composite gate 212, the value of i being within the range from 1 to $n-1$.

Figure 3:
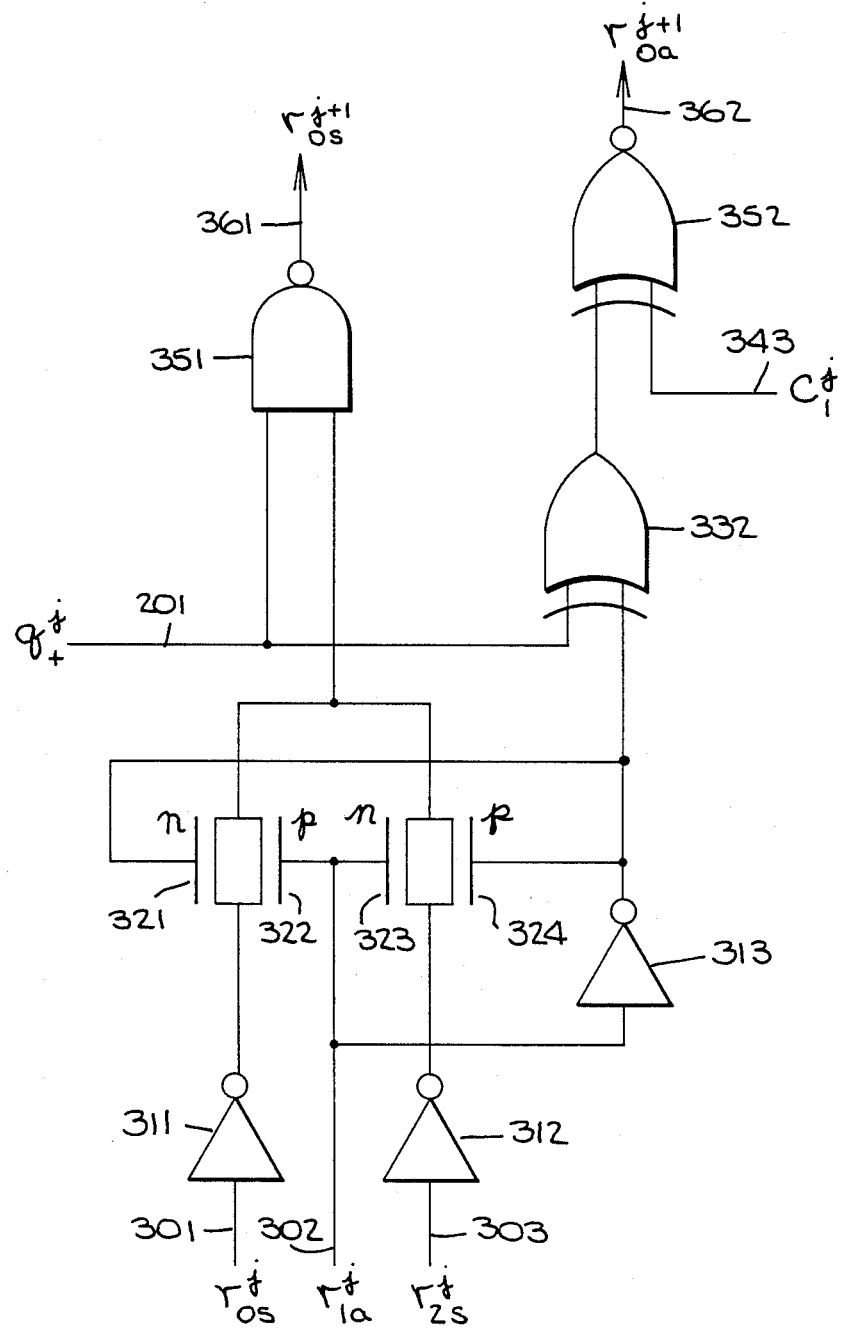
FIG. 3 is a circuit diagram of a redundant addition/subtraction cell of the arithmetic processor of FIG. 1 for addition/subtraction of the most significant digit.

FIG. 3 is a circuit diagram of an embodiment of the redundant addition/subtraction cells 120, 130, - - -, 170 of FIG. 1 for the most significant digit. In FIG. 3, gates 311, 312 and 313 are inverters; gate 352 is an exclusive NOR gate; gate 351 is a NAND gate; and gate 332 is an exclusive OR gate. An n-channel transistor 321 and p-channel transistor 322 from a transfer gate, and n-channel transistor 323 and p-channel transistor 324 form another transfer gate.

Signal 201 ($q_+{}^j$) is the same as signal 201 in FIG. 2. Signal 301 ($r_{0s}{}^j$) is a 1-bit signal representing the sign part of a 2-bit signal representing the most significant digit $r_0$ of the partial remainder. Signal 302 ($r_{1d}{}^j$) is a 1-bit signal representing the magnitude of the 2-bit signal representing the first decimal digit $r_1{}^j$ from the decimal point of the partial remainder. Signal 303 ($r_{2s}{}^j$) is a 1-bit signal representing the sign part of the 2-bit signal representing the second decimal digit $r_2{}^j$ from the decimal point of the partial remainder. Signal 343 ($C_1{}^j$) is a 1-bit signal representing the intermediate carry of the first decimal digit from the decimal point. Output signals 361 ($r_{0s}{}^{j+1}$) and 362 ($r_{0d}{}^{j+1}$) are 2-bit signals representing the most significant digit $r_0{}^{j+1}$ of the partial remainder after the j-th decimal digit $q^j$ from the decimal point of the quotient has been determined.

Since $y_0$ is always 0, in FIG. 3, the most significant digit of the addend $D^{(j)}$ is $d_0{}^j = d_+{}^j$, and the intermediate sum digit is determined by exclusive OR gate 332 and inverter 313, whereas the magnitude $r_{0d}{}^{j+1}$ of the most significant digit is determined by exclusive NOR gate 352 in the manner described for exclusive NOR gate 252 of FIG. 2. The sign part $r_{0s}{}^{j+1}$ of the most significant digit is determined such that after $q^j$ has been determined, the second digit $r_-{}^{j+1}$ of the integer part of the partial remainder is always 0. To that end, the sign part $r_{0s}{}^{j+1}$ of the most significant digit is determined from both the most significant three digits $r_0{}^{j+1}$, $r_1{}^j$ and $r_2{}^j$ of the partial remainder $R^{(j)}$ before the determination of $q^j$ and the j-th decimal digit $q^j$ from the decimal point of the quotient by the circuit composed of NOR gate 351, inverters 311, 313 and 312, transfer gate 321 and 322 and transfer gate 323 and 324.

Figure 4:
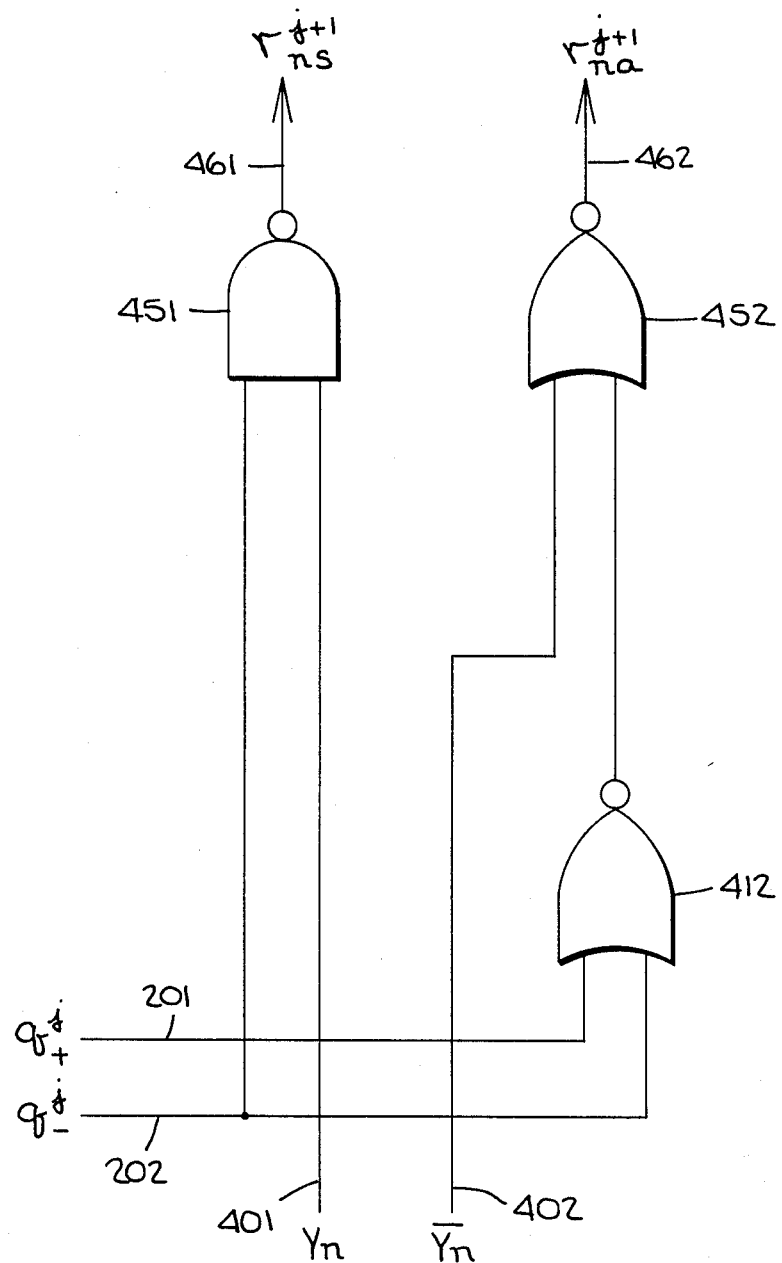
FIG. 4 is a circuit diagram of a redundant addition/subtraction cell of the arithmetic processor of FIG. 1 for addition/subtraction the least significant digit.

FIG. 4 is a circuit diagram of an embodiment of the redundant addition/subtraction cells 118, 128 and 138 of FIG. 1 for the least significant digit. In FIG. 4, gates 412 and 452 are NOR gates, and gate 451 is a NAND gate. Signals 201 ($q_+{}^j$) and 202 ($q_-{}^j$) form the same 2-bit signal as signals 201 and 202 in FIG. 2. Signal 401 ($y_n$) is the 1-bit signal 48 in FIG. 1 representing the n-th decimal digit from the decimal point of the divisor. Signal 402 ($\bar{y}_n$) is a signal representing the logical negation of the signal $y_n$. Output signals 461 ($r_{ns}{}^{j+1}$) and 462 ($r_{nd}{}^{j+1}$) form a 2-bit signal representing the least significant digit $r_n{}^{j+1}$ of the partial remainder after the j-th decimal digit $q^j$ from the decimal point of the quotient has been determined.

In FIG. 4, the magnitude $r_{nd}{}^{j+1}$ of the least significant digit $r_n{}^{j+1}$ of the partial remainder after the j-th decimal digit $q^j$ from the decimal point of the quotient has been determined is determined by the NOR gates 412 and 452, and the sign part $r_{ns}{}^{j+1}$ (signal 461) of that most significant digit $r_n{}^{j+1}$ is determined by the NAND gate 451. Intermediate carry $C_n{}^j$ from the least significant digit is represented in FIG. 4 by $q_+{}^j$ (signal 201) independently of the least significant digit $y_n$ of the divisor. In short, $C_n{}^j=1$ for the sign inversion of the divisor, and otherwise $C_n{}^j=0$.

Quotient determining cells 81, 82, 83, ---, 87 and 88 of FIG. 1 are described next. Each digit of the quotient is determined in dependence upon-the values of the most significant three digits $\{r_0{}^j \cdot r_1{}^j \cdot r_2{}^j\}_{SD2}$ of the partial remainder $R^{(j)}$. In short: $q^j = -1$ if the most significant three digits of $R^{(j)}$ are negative; $q^j=0$ if the most significant three digits of $R^{(j)}$ are zero; and $q^j=1$ if the most significant three digits of $R^{(j)}$ are positive. Therefore, in the conversion of the redundant binary number into a binary signal, the j-th decimal digit $q^j$ from the decimal point of the quotient can be determined by the following logical equations:

$\bar{r}_{0s}{}^j + \bar{r}_{0d}{}^j \cdot \bar{r}_{1s}{}^j + \bar{r}_{0d}{}^j \cdot \bar{r}_{2s}{}^j$; and $q_-{}^j = (r_{0d}{}^j r_{1d}{}^j + r_{2d}{}^j) \cdot \bar{r}_{0s}{}^j \cdot (r_{0d}{}^j + r_{1s}{}^j) \cdot (r_{0d}{}^j + r_{1d}{}^j + r_{2s}{}^j)$.

Figure 5:
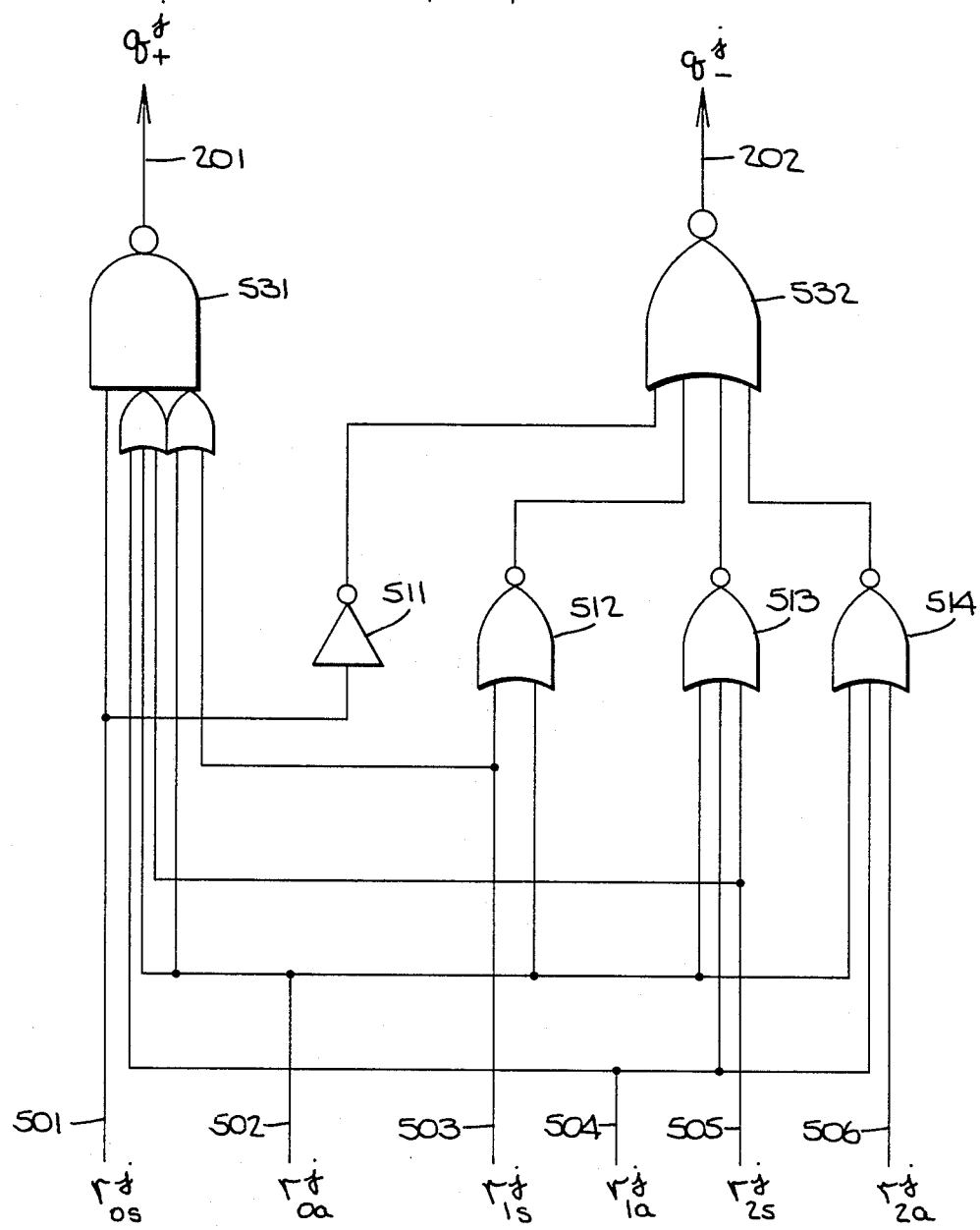
FIG. 5 is a circuit diagram of a quotient determining cell of the arithmetic processor of FIG. 1.

FIG. 5 is a circuit diagram of an embodiment of the quotient determining cells 81, 82, 83, ---, 87, 88 in FIG. 1. In FIG. 5, gate 511 is an inverter; gates 512, 513, 514 and 532 are NOR gates. Gate 531 is an OR-NAND composite gate. Signals 501 ($r_{0s}{}^j$) and 502 ($r_{0d}{}^j$) form a 2-bit signal representing the most significant digit $r_0{}^j$ of the partial remainder $R^{(j)}$. Signals 503 ($r_{1s}{}^j$) and 504 ($r_{1d}{}^j$) form a 2-bit signal representing the first decimal digit $r_1{}^j$ from the decimal point of $R^{(j)}$. Signals 505 ($r_{2s}{}^j$) and 506 ($r_{2d}{}^j$) form a 2-bit signal representing the second decimal digit $r_2{}^j$ from the decimal point of $R^{(j)}$. Output signals 201 ($q_+{}^j$) and 202 ($q_-{}^j$) form the 2-bit signal representing the j-th decimal digit from the decimal point of the redundant binary quotient and correspond to any of signals 91, 92, 93, ---, 97, 98 in FIG. 1. Signal 201 ($q_+{}^j$) represents whether or not the j-th decimal digit $q^j$ from the decimal point of the quotient is 1, and the signal 202 ($Q_-{}^j$) represents whether or not $q^j$ is $-1$.

In the above embodiment, each digit of the redundant binary number representing the partial remainder is converted into a common binary signal. However, the quotient determining cells or the cells for determining the most significant three digits of the partial remainder can also be simplified by converting the most significant three digits $r_0{}^j$, $r_1{}^j$ and $r_2{}^j$ into a binary signal (in which, for example, $-1$, 0 and 1 are represented by the 2-bit signals 01, 00 and 10, respectively).

As is well known in-the art, in-the above embodiments, the exclusive OR gates may be replaced by exclusive NOR gates in various combinations with inverters; the NAND gates may be replaced by NOR gates in combination with inverters; the composite gates may be constructed in combination with NAND or NOR gates; and a switch circuit such as the composite gate 212 of FIG. 2 may be constructed from the transfer gate of FIG. 3, and vice versa.

The redundant addition/subtraction cell of FIG. 2 has 32 transistors, if the exclusive NOR gate used has 6 transistors; and the critical path includes 3 to 4 gates, and the quotient determining cell of FIG. 5 has 38 transistors, and the critical path includes 2 gates.

Another embodiment of the invention will be described next in connection with FIGS. 6–8.

Figure 6:
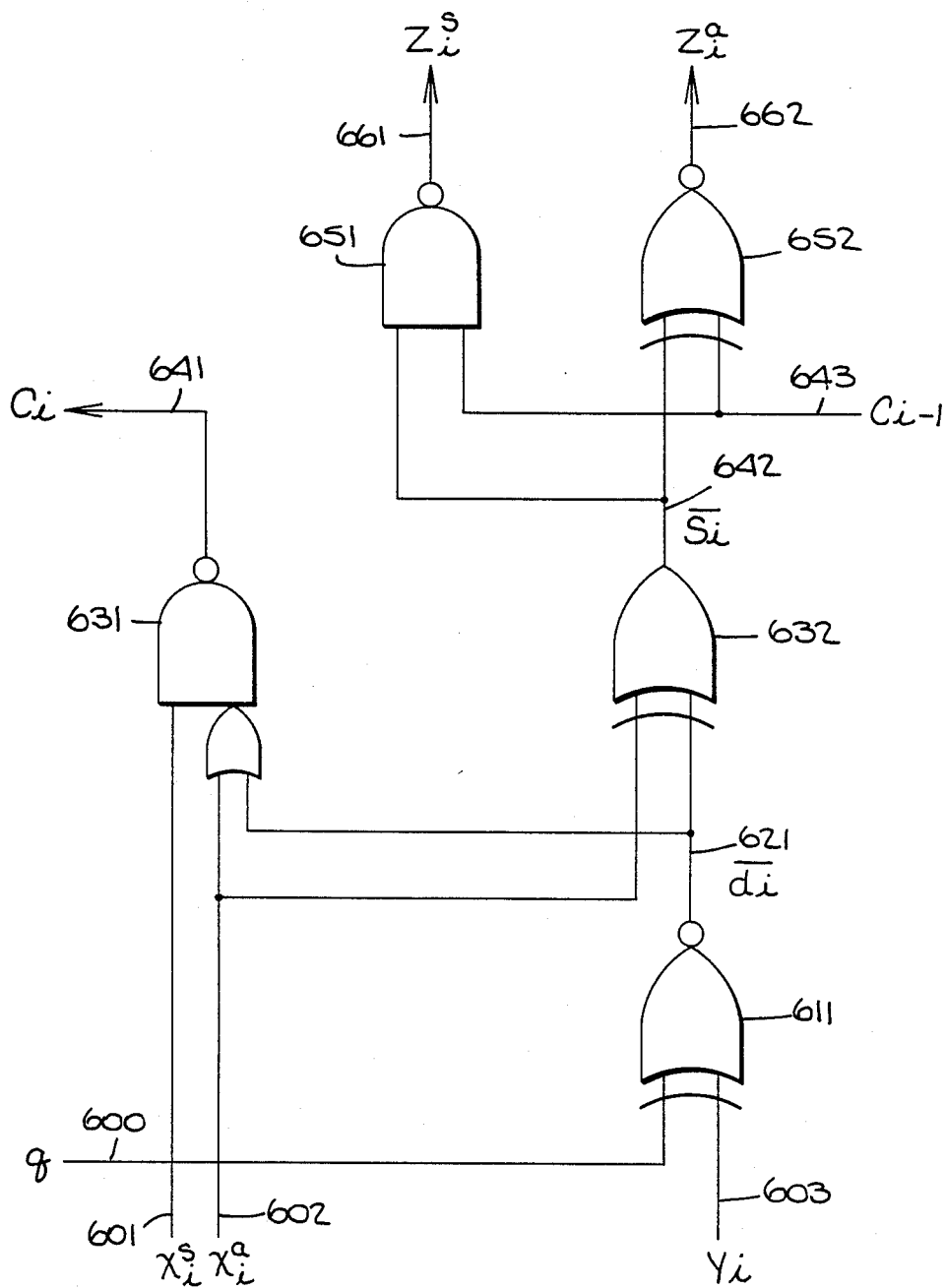
FIG. 6 is a circuit diagram of an arithmetic circuit for addition/subtraction relative to an intermediate digit according to the present invention.

FIG. 6 is a schematic circuit diagram of a basic arithmetic circuit for one digit to be added or subtracted in an arithmetic operation, and forms part of an arithmetic processor according to one embodiment of the present invention. The circuit of FIG. 6 performs addition/subtraction in accordance with the value of a control signal q. Addition is performed for q=0, and subtraction is performed for q=1. The circuit of FIG. 6 corresponding to one digit of the arithmetic algorithm expressed by the following equation:

$$Z = X + Q(Y),$$

where X is a redundant binary number, and Y is a redundant binary number having nonnegative digits except the most significant digit, i.e., $Q(Y)=Y$ for q=0; and $Q(Y)=-Y$ for q=1. Before describing FIG. 1 further, the sign inversion function $Q(Y)$ will be described.

In order that subtraction of X and Y for q=1 may be executed by a common adder to simplify circuit construction, the value $Q(Y)$ is always (i.e., independently of the value of q) a redundant binary number having nonnegative digits other than-the most significant digit. Y is selected herein to be a 2's complement binary number because a redundant binary number having nonnegative digits other than-the most significant digit, and a 2's complement binary number are easily interchangeable.

Now, for simplicity, both X and Y are assumed to be integers of n digits. Specifically, $X = \{x_{n-1} --- x_1 x_0\}_{SD2}$ and 31 $1y = \{y_{n-1} --- y_1 y_0\}_2$. The redundant binary number is denoted by $\{\}_{SD2}$, and the 2's complement binary number is denoted by $\{\}_2$. According to these expressions, $$X = \sum_{i=0}^{n-1} x_i \times 2^i$$

and $y = -y_{n-1} \times 2^{n-1} + \sum_{i=0}^{n-2} y_i \times 2^i$, where, $y_{n-1}$ is assumed to be a sign bit, which is 0 for a number having no sign bit. In the case of positive Y, i.e., $y_{n-1}=0$, the expressions $$-2^{n-1} + \sum_{i=0}^{n-2}(1-y_i) \times 2^i + 1, \text{ i.e.,}$$

$$-2^{n-1} + \sum_{i=0}^{n-2} 2^i + 1 - \sum_{i=0}^{n-2} y^i \times 2^i, \text{ may be represented by:}$$

$$(1\ \bar{y}_{n-2} \ldots \bar{y}_1\ \bar{y}_0)_{SD2} + 1.$$

Since $$\sum_{i=0}^{n-2} 2^i = 2^{n-1} - 1$$

in the above expression, it is understood that $$-\sum_{i=0}^{n-2} y_i \times 2^i = -Y,$$

and the following holds:

$$-Y = \{\bar{1}\bar{y}_{n-2} \cdots \bar{y}_i\ \bar{y}_0\}_{SD2} + 1,$$

where, "$\bar{1}$" is $-1$, and "$\bar{y}_i$" is the logical negation of $y_i$. In the case of negative Y, i.e. $y_{n-1} = 1$, $-Y$ is expressed as a binary number in the 2's complement binary expression as follows:

$$-Y = \{0\ \bar{y}_{n-2} \cdots \bar{y}_1\ \bar{y}_0\}_2 + 1,$$

which may be expressed in the redundant binary expression as follows:

$$-y = \{0\ \bar{y}_{n-2} \cdots \bar{y}_1\ \bar{y}_0\}_{SD2}\cdot 1.$$

In other words, the sign inversion of Y in the redundant binary system is expressed by the following equation:

$$-Y = \{(-\bar{y}_{n-1})\ \bar{y}_{n-2} \cdots \bar{y}_1\ \bar{y}_0\}_{SD2} + 1$$

where $-y_{n-1}$ is equal to $-y_{n-1} - 1 \pmod 2$, and $\bar{y}_i$ is equal to $1 - y_i$.

The first term on the right hand side of the equation is a redundant binary number having nonnegative digits other than the most significant digit. Therefore, the arithmetic algorithm addition equation can be expressed as follows:

For $q = 0$:  (I)

$$(z_n\ z_{n-1} \ldots z_0)_{SD2} = (x_{n-1}\ x_{n-2} \ldots x_1\ x_0)_{SD2} +$$

$$(y_{n-1}\ y_{n-2} \ldots y_1\ y_0)_2; \text{ and}$$

For $q = 1$:  (II)

$$(z_n\ z_{n-1} \ldots z_0)_{SD2} = (x_{n-1}\ x_{n-2} \ldots x_1\ x_0)_{SD2} +$$

$$(0\ \bar{y}_{n-2} \ldots \bar{y}_1\ \bar{y}_0)_2 +$$

$$((-\bar{y}_{n-1})0 \ldots 0\ 0)_{SD2} + 1.$$

FIG. 6 shows a circuit for performing arithmetic operations on 1st to (n−2)th digits of the equations (I) and (II) above in accordance with the value of the control signal q. FIG. 7 shows a circuit for performing arithmetic operations on the most significant digit, i.e., the (n−1)th digit, of equations (I) and (II) in accordance with the value of the control signal q. FIG. 8 shows a circuit for arithmetic operations on the least significant digit, i.e., the 0-th digit, of equations (I) and (II) in accordance with the value of the control signal q.

Conversion of a redundant binary signal into a binary number according to an embodiment of the present invention will be described next.

One bit $x_i$ or $z_i$ of a redundant binary number is represented by a 2-bit signal $x_i^s\ x_i^a$ or $z_i^s\ z_i^a$, and $-1$, 0 and 1 are represented by 11, 10 and 01, respectively, in 2-bit binary signals. The i-th digit $d_i$, the intermediate sum digit $s_i$ and the intermediate carry $c_i$ of the second term Q(X) of the above arithmetic algorithm equation ca be determined by the following logical equations, respectively:

$$d_i = q \oplus y_i;$$

$$s_i = x_i^a \oplus d_i; \text{ and}$$

$$c_i = \bar{x}_i^s + \bar{x}_i^a \cdot d_i.$$

The final sum $z_i$ is represented by the 2-bit signal expressed by the following equations:

$$z_i^s = s_i + \bar{c}_{i-1}; \text{ and}$$

$$z_i^a = s_i \oplus c_{i-1},$$

where, i designates an integer from 1 to (n−1). Moreover, $z_n$ is represented by the 2-bit signal expressed by the following equations:

$$z_n^s = x_{n-1}^s + d_{n-1}; \text{ and}$$

$$z_n^a = x_{n-1}^s \cdot x_{n-1}^a \cdot d_{n-1} + \bar{x}_{n-1}^s \cdot \bar{d}_{n-1}$$

The value of $z_0$ and the carry $c_0$ from the 0-th digit are given by the following logical equations:

$$z_0^s = (y_0 x_0^s) \cdot (\bar{y}_0 + \bar{x}_0^s + x_0^a);$$

$$z_0^a = x_0^a \oplus y_0; \text{ and}$$

$$c_0 = \bar{x}_0^s \cdot y_0 + q \cdot \bar{y}_0.$$

In the logical equations described above, the symbols ".", "+" and "⊕" designate the operators representing the logical product (AND), the logical sum (OR) and the exclusive logical sum (EX OR), respectively, and the symbols "$\bar{x}_i^s$" and "$\bar{c}_{i-1}$" designate the logical negations of $x_i^s$ and $c_{i-1}$, respectively.

FIG. 6 is a circuit diagram showing an arithmetic addition/subtraction circuit for an intermediate digit in accordance with the binary signal conversion described above. In FIG. 6, gates 611 and 652 are exclusive NOR gates; gate 632 is an exclusive OR gate; gate 651 is a NAND gate; and gate 631 is an OR-NAND composite gate. Signal 600 (q) is a control signal for controlling addition (for q=0) and subtraction (for q=1). Signals 601 ($x_i^s$) and 602 ($x_i^a$) are a 2-bit signal representing the i-th digit of the redundant binary number X. Signal 603 ($Y_i$) is a 1-bit signal representing the i-th digit of the binary number (or the nonnegative redundant binary number) Y. Signal 621 ($\bar{d}_i$) designates the logical negation of the i-th digit $d_i$ of the added number Q(Y). Signal 641 ($c_i$) is a 1-bit output signal representing the intermediate carry of the i-th digit. Signal 642 ($\bar{s}_i$) is a 1-bit output signal representing the logical negation of the intermediate sum digit $s_i$ of the i-th digit. Signal 643 ($c_{i-1}$) is a 1-bit signal representing the intermediate carry from the (i−1)th digit. Output signals 661 ($z_i^s$) and 662 ($z_i^a$) are a 2-bit signal representing the i-th digit of the arithmetic result Z.

In FIG. 6, the addition circuit for adding the redundant binary number X and the binary number Q(Y) is composed of the OR-NAND composite gate 631, exclusive OR gate 632, NAND gate 651 and exclusive NOR gate 652. Intermediate carry $c_i$ (641) is provided by OR-NAND composite gate 631. The logical negation $\bar{s}_i$ (642) of the intermediate sum digit $s_i$ is provided by exclusive OR gate 632. The circuit composed of the NAND gate 651 and exclusive NOR gate 652 receives signal 643 ($c_{i-1}$) representing the intermediate carry from a lower order digit and outputs the final sum as a 2-bit signal $z_i^s$ (661) and $z_i^a$ (662). Exclusive NOR gate 611 (the second means) performs the logical negation of an intermediate digit (i.e., a digit from the 1st digit to the (n−2)th digit) for inverting the positive and negative signs of the binary number (or the nonnegative redundant binary number) Y in accordance with the value of the control signal q. The exclusive NOR gate 611 operates as follows:

For q=0:

$$\bar{d}_i = \overline{0 \oplus y_i}, \text{ i.e. } d_i = y_i, \text{ and}$$

For q=1:

$$\bar{d}_i = \overline{1 \oplus y_i}, \text{ i.e. } d_i = \bar{Y}_i,$$

which infers that $0 \oplus y_i = y_i$ and $1 \oplus y_i = \bar{y}_i$.

Figure 7:
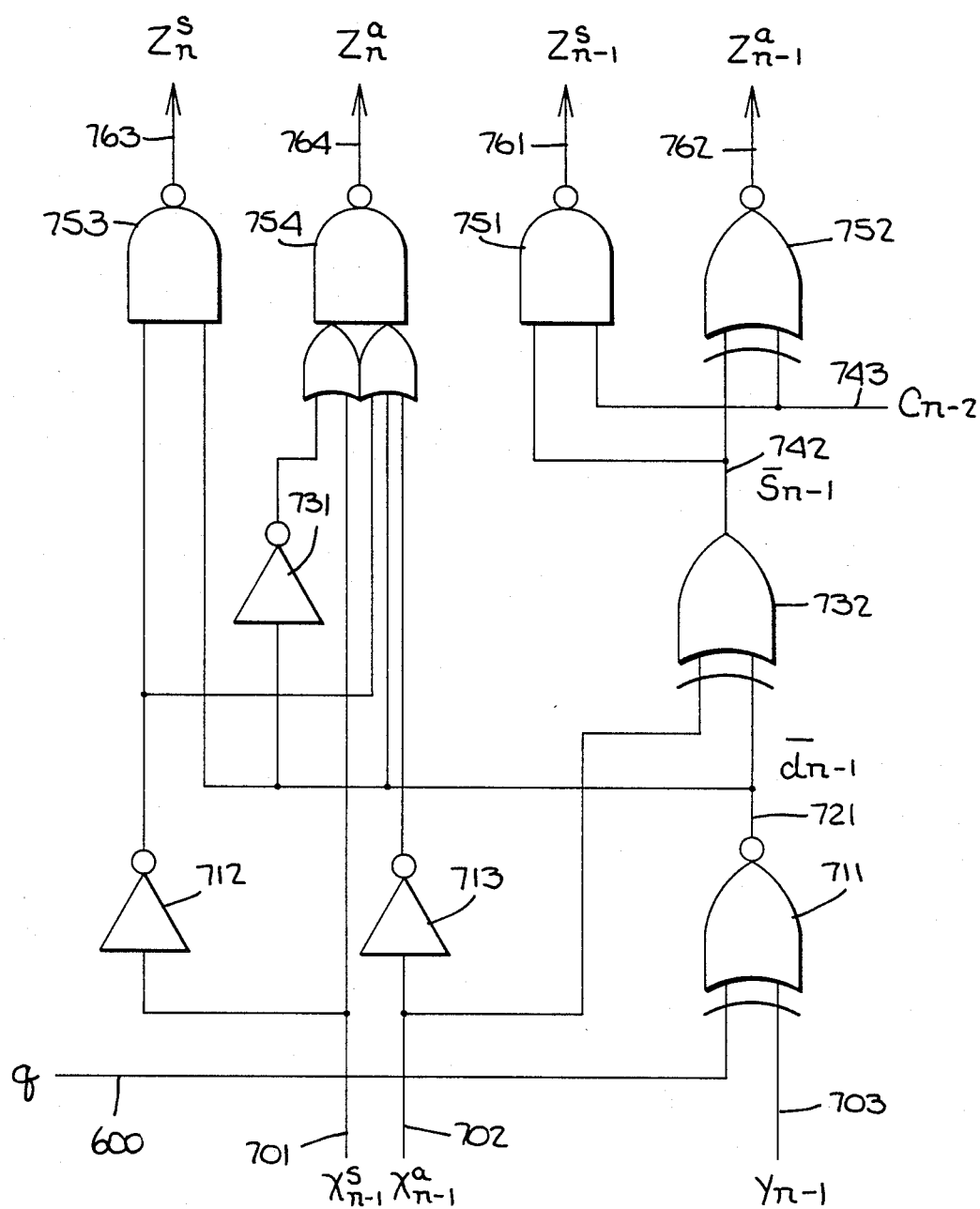
FIG. 7 is a circuit diagram of an arithmetic circuit for addition/subtraction relative to the most significant digit according to the present invention.

FIG. 7 is a circuit diagram showing an arithmetic circuit for addition/subtraction of the most significant digit according to equations (I) and (II). In FIG. 7, gates 711 and 752 are exclusive NOR gates; gate 732 is an exclusive OR gate gates 712, 713 and 731 are inverters; gates 751 and 753 are NAND gates; and gate 754 is a NAND composite gate. Control signal 600 (q) is the same signal 600 in FIG. 6. Signals 701 ($x_{n-1}^s$), 702 ($x_{n-1}^a$), 703 ($y_{n-1}$), 721 ($\bar{d}_{n-1}$), 742 ($\bar{s}_{n-1}$), 761 ($Z_{n-1}^s$) and 762 ($z_{n-1}^a$) are the same signals as signals 601 ($x_i^s$), 602 ($x_i^a$), 603 ($Y_i$), 621 ($\bar{d}_i$), 642 ($\bar{s}_i$), 643 ($c_{i-1}$), 661 ($z_i^s$) and 662 ($z_i^a$) for i=n−1. Signals 763 ($z_n^s$) and 764 ($z_n^a$) are a 2-bit output signal representing the n-th digit of the arithmetic result Z.

In FIG. 7, an addition circuit includes exclusive OR gate 732 determines the logic negation $\bar{s}_{n-1}$ of the intermediate sum si; NAND gate 751 and exclusive NOR gate 752 determine the 2-bit signal 761 ($z_{n-1}^s$) and 762 ($z_{n-1}^a$) from signal 742 ($\bar{s}_{n-1}$) representing the logical negotiation of the intermediate sum digit and signal 743 ($c_{n-2}$) representing the intermediate carry from a lower order digit. Exclusive NOR gate 711 (the first means) takes the logic negation of the most significant (i.e., (n−1)th) digit in accordance with the value of the control signal q. Operation of exclusive OR gate 711 is similar to that of exclusive NOR gate 611 of FIG. 6.

Regardless of whether the logical negation $\bar{y}_{n-1}$ of $y_{n-1}$ has its sign inverted and is added, or $y_{n-1}$ is added as it is, the intermediate sum $s_{n-1}$ is common so that sign inversion of the logical negation of $\bar{y}_{n-1}$ affects only the n-th digit of the arithmetic result. The means for inverting the sign of the logical negation $\bar{y}_{n-1}$ of $y_{n-1}$ is composed of NAND gate 753, OR-NAND composite gate 754 and the inverters 712, 713 and 731 in combination with the circuit for determining the intermediate carry of the (n−1)th digit. The circuit thus constructed operates such that: $z_n = 1$ for $d_{n-1} = 0$ and $x_{n-1} = 1$; $z_n = 1$ for $d_{n-1} = 1$ and $x_{n-1} = -1$; $z_n = 0$ otherwise.

Figure 8:
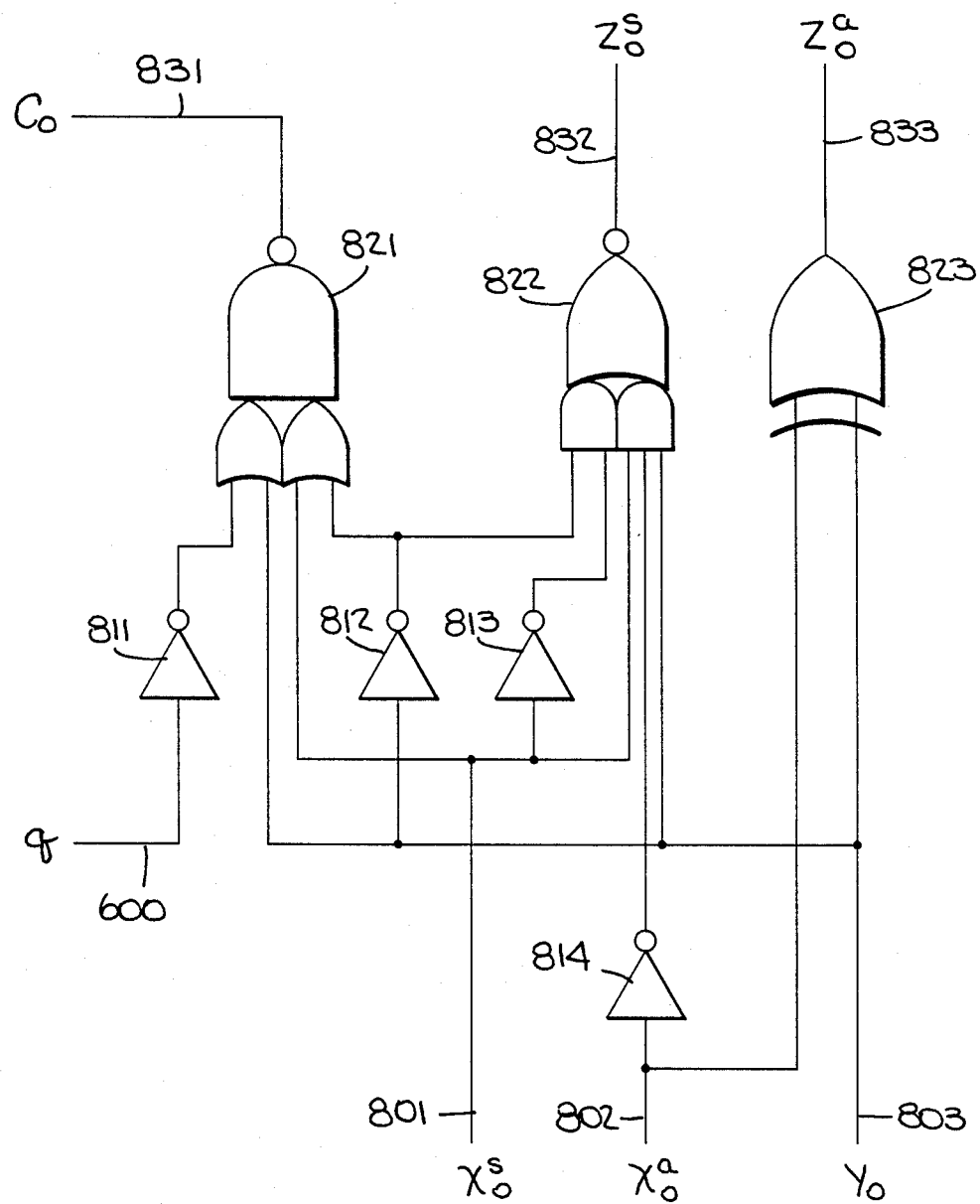
FIG. 8 is a circuit diagram of an arithmetic circuit for addition/subtraction relative to the least significant digit according to the present invention.

FIG. 8 is a circuit diagram of an arithmetic circuit for addition/subtraction of the least significant digit in accordance with equations (I) and (II) above. In FIG. 8, gates 811, 812, 813 and 814 are inverters; gate 821 is an OR NAND composite gate; gate 822 an AND-NOR composite gate; and gate 823 is an exclusive OR gate.

Control signal 600 (q) is the same as signal 600 in FIG. 6. Signals 801 ($x_0^s$) and 802 ($x_0^a$) are a 2-bit signal representing the 0-th digit of the redundant binary number X. Signal 803 ($y_0$) is a 1-bit signal representing the 0-th digit of the binary number (or nonnegative redundant binary number) Y. Signal 831 ($c_0$) is a 1-bit signal representing the intermediate carry of the 0-th digit. Signals 832 ($z_0^s$) and 833 ($z_0^a$) are a 2-bit output signal representing the 0-th digit of the arithmetic result.

In FIG. 8, if 1 is added to the logical negation $\bar{y}_0$ of the least significant digit (i.e., the 0-th digit) of Y, the following results are obtained so that the least significant digit $y_0$ is unchanged even without sign inversion of Y:

For $y_0 = 0$:

$$y_0 + 1 = 1 \times 2 + y_0; \text{ and}$$

For $y_0 = 1$:

$$y_0 + 1 = 0 \times 2 + y_0.$$

Moreover, sign inversion of Y affects the intermediate carry such that the carry occurs for q=1 and $y_0 = 0$.

In FIG. 8, therefore, the circuit composed of the composite gate 822, exclusive OR gate 823, inverters 812, 813 and 814 and one half of the composite gate 821 (i.e., the gate receiving the output of inverter 812 and input 801) is an addition circuit for the least significant digit without inversion of the sign of Y. The means (the third means) for adding 1 to the least significant digit in accordance with the value of the control signal 600 (q) is implemented by that part of the composite gate 821 which receives the output of inverter 811. Specifically, that part of gate 821 operates such that the intermediate carry (831) of the least significant digit $c_0$ is 1 for q=1 and $y=0$.

The arithmetic circuit of FIG. 6 is composed of 28 transistors, if exclusive OR and NOR gates of six transistors are used, and the number of gates in the critical path is three.

Next, an embodiment will be described in which partial remainder memory means and (partial) quotient memory means are coupled to the dividers of the foregoing embodiments so that the identical combinational circuit may be used L times.

Figure 9:
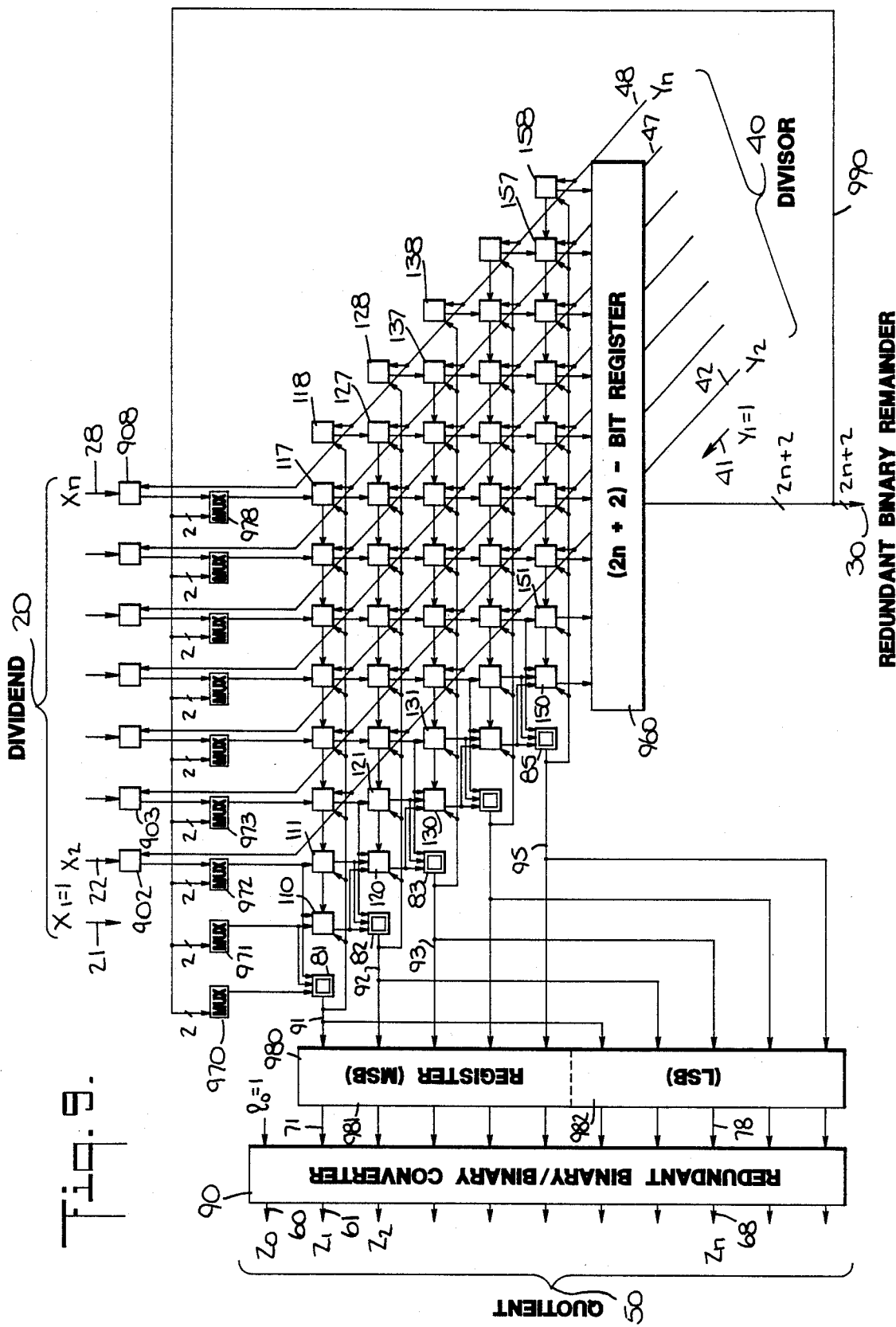
FIG. 9 is a block diagram of an arithmetic processor according to another embodiment of the present invention.

FIG. 9 depicts a block diagram of a division unit according to another embodiment of the present invention. Like FIG. 1, FIG. 9 represents the case for n 8. Dividend 20 represented by $\{0 \cdot x_1 x_2 \text{---} x_n\}_2$ and divisor 40 represented by $\{0 \cdot y_1 y_2 \text{---} y_n\}_2$ are input to the division unit as signals 21, 22, ---, 28 (representing $x_1$, $x_2$, ---, $x_n$, respectively, which correspond respectively to the values of the first, second, ---, n-th decimal digits from the decimal point), and as signals 41, 42, ---, 48 (representing $y_1$, $y_2$, ---, $y_n$, respectively, which correspond respectively to the first, second, ---, n-th decimal digits from the decimal point). The division unit outputs quotient 50 represented by $\{0 \cdot z_1 z_2 \text{---} z_n\}_2$ in the form of a number having a first digit and values of first, second, and n-th decimal digits from the decimal point corresponding respectively to signals 60 ($z_0$), 61 ($z_1$), - - -, 68 ($z_n$).

Blocks 110, - - -, 158 are redundant addition/subtraction cells similar to cells 111, - - -, 173 of FIG. 1. Blocks 902, - - -, 908 are redundant subtraction cells for subtracting the individual digits $y_2$, - - -, $y_n$ of the divisor 40 (represented by signals 42, - - -, 48, respectively) from the individual digits $x_2$, - - -, $x_n$ of the dividend 20 (represented by signals 22, - - -, 28, respectively), and outputting redundant binary numbers.

The following form individual partial remainder determining circuits: the circuit composed of blocks 902, - - - 908; the circuit composed of blocks 110, 111, - - -, 118; the circuit composed of the blocks 120, 121, - - -, 128; the circuit composed of the blocks 130, 131, - - -, 138; and the circuit composed of the blocks 150, 151, - - -, 158. In each of the individual partial remainder determining circuits, the higher stage partial remainder $R^{(j+1)}$ after the j-th digit of the quotient has been determined is determined from the output $R^{(j)}$ of the partial remainder determining circuit (e.g., (j−1) circuit) and the value $q^j$ of the j-th decimal digit of the quotient.

Blocks 81, 82, 83, - - -, 85 are quotient determining cells similar to cells 81, 82, 83, - - -, of FIG. 1, respectively. The quotient determining cells each receive the partial remainder $R^{(j)}$ which is the output of the higher stage partial remainder determining circuit (e.g., (j−1)th circuit) to determine the value $q^j$ represented by signals 91, 92, 93, - - -, 95 of the j-th decimal digit from the decimal point of the quotient expressed in a redundant binary expression.

Register 960 is a (2n+2) bit register for storing the partial remainders of the (n+1)th digit expressed as a redundant binary number.

Multiplexers 972, 973, - - -, 978 select the outputs of redundant subtraction cells 902, 903, - - -, 908 in response to a first clock signal and select a partial remainder signal 990 from register 960 in response to a subsequent clock signal to thereby select the second, third, - - -, n-th decimal digits from the decimal point. Multiplexers 970 and 971 select the value 0 (in-the redundant binary expression) in response to the first clock signal and select the first digit of the integer part and the first decimal digit from the decimal point of the partial remainder 990 in response to the subsequent clock signal.

Register 980 (quotient memory means) is composed of a MSB register part 981 and an LSB register part 982 for storing m-th digit redundant binary numbers, i.e., 2m-bits.

Signals 91, 92, 93, - - -, 95 represent digits $q^1$, $q^2$, $q^3$, $q^m$, respectively, of the quotient Q in the redundant binary expression which are stored in the MSB register part 981 of register 980 in response to the first clock signal and in-the LSB register part 982 of register 980 in response to the subsequent clock signal. The letter "m" designates a maximum integer not exceeding (n+1)/2 or a larger integer, and in the present embodiment, m=5. In other words, register 980 stores the first, second, - - -, n-th decimal digits from the decimal point of the quotient Q after the two clock signals have been generated.

The LSB register part 981 of register 980 may be omitted, and signals 91, 92, 93, - - -, 95 representing digits of the quotient Q may be input at the second clock signal directly to the lower order digit part of the redundant binary/binary converter 90.

Redundant binary/binary converter 90 receives signals 71, 72, 73, - - -, 78 representing individual decimal digits from the decimal point of the quotient Q expressed in the redundant binary expression, and outputs signals 60 representing the first digit $Z_0$ of the integer part of the quotient in the binary expression and signals 61, - - -, 68 representing the individual decimal digits from the decimal point $z_1$ - - -, $z_n$ of the quotient in the binary expression. This redundant binary/binary converter 90 is a circuit for subtracting a signless binary number $Q^-$, which is obtained by setting the "−1" digits of the quotient Q to 1, from a signless binary number Q which is obtained by setting the "1" digits of the quotient Q in the redundant binary expression to 1. The converter 90 can be implemented by a conventional ripple carry addition unit or a conventional carry look ahead addition unit.

Register 960 stores a remainder 30 in the redundant binary expression after the two clocks signals have been generated.

In FIG. 9, subtraction is performed by using m stages which are composed of the quotient determining circuit and the partial remainder determining circuits. Generally speaking, however, the division unit in FIG. 9 can also be constructed using those determining circuits three times or more. Partial remainder determining circuits 902, - - -, 907, 908 for the most significant digit determine each digit of a redundant binary number. These digits are obtained from the subtraction of each digit of the binary number X, Y.

In-the embodiments described above, sign inversion of a redundant binary number having nonnegative digits is implemented as part of arithmetic processing of addition/subtraction by binary logic in the shift-subtract restoring division unit. It is, however, possible according to the present invention to utilize sign inversion of a redundant binary number having nonpositive digits. Moreover, the present invention can be implemented using different technologies (e.g., NMOS, ECL, TTL or IIL) or higher-radix logic.

According to the present invention, the critical path necessary to implement the basic arithmetic algorithm such as addition/subtraction between a redundant binary number and a binary number includes 3 to 4 gates independently of the number digits of the arithmetic numbers. The arithmetic cell for the basic arithmetic algorithm requires about 30 transistors per digit.

In a divider constructed of combinational circuits having the regular array structure of the present invention, as compared with the shift-subtract restoring division unit having the array structure of the ripple carry addition unit of the prior art, the number of transistors can be reduced to substantially one-half or one-fourth, and computing time (i.e., the number of gates in the critical path) can be reduced to about one twelfth for division of 32-bits and about one twenty fourth for the division of 64 bits. Moreover, the number of transistors can be reduced to about one-half as compared with the shift-subtract restoring division unit using redundant binary addition/subtraction unit of the prior art.

According to the present invention, addition and subtraction in an arithmetic operation of an arithmetic processor is executed using a signed digit expression number having positive, zero or negative digits. Sign inversion of a number in a signed digit expression number having nonnegative (or nonpositive) digits other than-the most significant digit may be performed using the same signed digit expression having with nonnegative (or nonpositive) digits other than the most significant digit. Sign inversion can be executed such that the addition, subtraction or digit shift in the internal arithmetic algorithms such as division or multiplication, can be implemented by either redundant addition circuitry or redundant subtraction circuitry which receives the signed digit expression number and a binary number (in the 2's complement expression). As a result, carry or borrow of each digit in addition and subtraction cannot propagate beyond one digit. Also, hardware for a high speed array divider can be reduced, and the machine cycle time can be shortened, by utilizing the same part or circuit a number of times in an array. The invention provides the following advantages:

(1) the number of transistors required to implement the arithmetic processor can be reduced to half as compared to the prior art;

(2) since addition and subtraction can be performed at high speed within a predetermined period of time irrespective of the number of digits, it is possible to increase the operational speed of the arithmetic processor;

(3) circuit structure can be simplified; and (4) the arithmetic processor can readily be implemented easily and economically on an LSI chip.

What is claimed is:

1. An arithmetic processing unit for performing arithmetic operations utilizing radix r signed-digit operands having N digits which have positive or negative digit values, said arithmetic processing unit comprising:

(a) first means coupled to receive a signal representative of the most significant digit $y_{N-1}$ of a signed-digit operand Y whose digits, other than-the most significant digit, are non-negative, said first means providing a signal corresponding to a digit of value $-(y_{N-1})$ minus 1 modulo r which represents the sign inversion of said most significant digit;

(b) second means coupled to receive a signal representative of each digit $y_i$, other than-the most significant digit, of said operand Y, said second means providing a signal corresponding to a digit of value $(r-1)-y_i$, representing the $(r-1)$'s complement of the digit $y_i$, where i is an index that assumes integer values ranging between 0 and $N-2$; and (c) third means coupled to receive the output signal representing the least significant digit $y_0$ of said operand Y from said second means, said third means providing a signal corresponding to the $(r-1)$'s complement of the least significant digit $((r-1)-y_0)$ plus 1, whereby said first, second and third means invert the sign of said signed-digit operand Y having non-negative digits other than-the most significant digit.

2. The arithmetic processing unit according to claim 1 wherein each of said first, second and third means are further coupled to receive a control signal and to output respective signals which represent the digits of either the sign-inverted operand $-Y$ or the digits of said operand Y, depending upon-the value of said control signal, said arithmetic processing unit further including arithmetic means coupled to receive said respective signals derived from said first, second and third means and signals representing a signed-digit number X, and providing signals representative of the sum of difference of said numbers X and Y, depending upon the value of said control signal.

3. An arithmetic processing unit for performing arithmetic operations utilizing radix 2 signed-digit operands having N digits, each digit of which may assume values of 1, 0 and $-1$, said arithmetic processing unit comprising:

(a) first means coupled to receive a signal representative of the most significant digit $y_{N-1}$ of a signed-digit operand Y whose digits other than-the most significant digit are non-negative, said first means providing a signal representing a digit of value $-(y_{N-1})-1$ (mod 2) which equals 0 if said most significant digit $y_{N-1}$ is 1 or $-1$, or which equals $-1$ if said most significant digit $y_{N-1}$ is 0;

(b) second means coupled to receive a signal representative of each digit $y_i$ other than-the most significant digit of said operand Y, said second means providing a signal corresponding to a digit of value $1-y_i$, representing the logical negation of the digit $y_i$, where i is an index that assumes integer values ranging between 0 and $N<2$; and (c) third means coupled to receive the output signal representing the least significant digit $y_0$ of said operand Y, said third means providing a signal corresponding to the logical negation of the least significant digit plus 1 $(1-y_0+1)$;

whereby said first, second and third means invert the sign of said signed-digit operand Y having non-negative digits other than-the most significant digit.

4. The arithmetic processing unit according to claim 3 wherein said first means comprises logic circuitry having at least one exclusive OR gate, one input of which receives a 1-bit signal representing said most significant digit $y_{N-1}$, another input of which receives a control signal, and an output of which provides a 1-bit signal representing either said most significant digit $y_{N-1}$ or the most significant digit of the sign inversion $-y$ of said signed-digit operand Y, depending upon-the value of the control signal.

5. The arithmetic processing unit according to claim 4 wherein each of said first, second and third means are further coupled to receives a control signal and provide respective signals which represent digits of either the sign-inverted operand $-Y$ or digits of said operand Y depending upon-the value of said control signal, said arithmetic processing unit further including arithmetic means coupled to receive said respective signals derived from said first, second and third means and signals representing a signed-digit number X, and providing signals representative of either the sum or difference of said numbers X and Y depending upon-the value of said control signal.

6. The arithmetic processing unit according to claim 3 wherein said second means comprises at least one exclusive OR gate, having one input which receives a 1-bit signal representing each digit $y_i$ other than said most significant digit of said signed-digit operand Y, another input which receives a control signal, and an output which provides a 1-bit signal representing either said digit $y_i$ or the logical negation of said digit $y_i$ depending upon-the value of the control signal.

7. The arithmetic processing unit according to claim 6 wherein each of said first, second and third means are further coupled to receives a control signal and provide respective signals which represent digits of either the sign-inverted operand $-Y$ or digits of said operand Y depending upon the value of said control signal, said arithmetic processing unit further including arithmetic means coupled to receive said signals derived from said first, second and third means and signals representing a signed-digit number X, and providing signals representative of either the sum or difference of said numbers X and Y depending upon-the value of said control signal.

8. The arithmetic processing unit according to claim 3 further comprising a fourth means coupled to receive a 1-bit signal representing said least significant digit $y_0$ and a control signal, and depending upon-the value of said control signal and the least significant digit $y_0$, providing the same 1-bit signal representative of said least significant digit $y_0$ and a signal indicating a carry bit, whereby said first, second and fourth means provide signals representing the sign inversion $-Y$ of a signed-digit operand Y having non-negative digits other than-the most significant digit.

9. The arithmetic processing unit according to claim 8 wherein said first, second and third means are further coupled to receive a control signal and provide respective signals which represent either digits of the sign-inverted operand $-Y$ or digits of said operand Y depending upon with the value of said control signal, said arithmetic processing unit including arithmetic means coupled to receive said signals derived from said first, second and fourth means and signals representing a signed-digit number X, said arithmetic means providing a signal representative of either the sum or difference of said number X and Y, depending upon-the value of said controls signal.

10. The arithmetic processing unit according to claim 9 wherein the intermediate carry bit of the least significant digit is either the carry from said fourth means or a carry produced from the addition of the least significant digits $x_0$ and $y_0$, of said numbers X and Y.

11. The arithmetic processing unit according to claim 3 wherein each of said first, second and third means are further coupled to receive a control signal and, depending upon the value of said control signal provide respective signals which either represent digits of the sign-inverted operand $-Y$ or digits of said operand Y, said arithmetic processing unit further including arithmetic means coupled to receive said respective signals derived from said first, second and third means and to receive signals representing a signed-digit number X, said arithmetic means providing a signal representative of the sum of difference of said number X and Y depending on the value of said control signal.

12. An arithmetic processing unit for performing arithmetic operations utilizing radix r signed-digit operands having N digits which have positive or negative digit values, said processing unit comprising:
 (a) first means coupled to receive a signal indicating the most significant digit $y_{N-1}$ of a signed-digit operand Y whose digits, other than-the most significant digit, are non-positive said first means providing a signal corresponding to a digit of value $-(y_{N-1})$ plus 1 modulo r which represents the sign inversion of said most significant digit;
 (b) second means coupled to receive a signal representative of each digit $y_i$ other than-the most significant digit of said operand Y, said second means providing a signal corresponding to a digit $-(r-1)-y_i$ representing the $-(r-1)$'s complement of the digit $y_i$, where i is an index that assumes integer values ranging between 0 and N−2; and
 (c) third means coupled to receive the output signal of the least significant digit $y_0$ of said operant Y from said second means, said third means providing a signal corresponding to the $-(r-1)$'s complement of the least significant digit $(-(r-1)-y_0)$ minus 1;

whereby said first, second and third means invert the sign of said signed digit operand Y having non-positive digits other than-the most significant digit.

13. The arithmetic processing unit according to claim 12 where in each of said first, second and third means are further coupled to receives a control signal and to output respective signals which represent the digits of either the sign-inverted operand $-Y$ or digits of said operand Y in accordance with the value of said control signal, said arithmetic processing unit further including arithmetic means coupled to receive said respective signals derived from said first, second and third means and to receive signals representing a signed-digit number X, said arithmetic means providing signals representative of the sum or difference of said numbers X and Y, depending upon-the value said control signal.

14. An arithmetic processing unit for performing arithmetic operations utilizing radix 2 signed-digit operands having N digits, each digit of which may assume values of 1, 0 and −1, said arithmetic processing unit comprising:
 (a) first means coupled to receive a signal representative the most significant digit $y_{N-1}$ of a signed-digit operand Y whose digits, other than-the most significant digit, are non-positive said first means providing a signal representing a digit of value $-(y_{N-1})+1$ (mod 2) which equals 0 if said most significant digit $y_{N-1}$ is 1 or −1, or which equals 1 if said most significant digit $y_{N-1}$ is 0;
 (b) second means coupled to receive a signal representative of each digit $y_i$ other than-the most significant digit of said operand Y, said second means providing a signal corresponding to a digit of value $-1-y_i$ representing the $-1$'s complement of the digit $y_i$, and which equals 0 if the digit $y_i$ is −1, or −1 if the digit $y_i$ is 0, where i is an index which assumes integer values ranging from 0 to N−2; and
 (c) third means coupled to receive the output signal representing the least significant digit $y_0$ of said operand Y from said second means, said third means providing a signal corresponding to the $-1$'s complement of the least significant digit $(-1-y_0)$ minus 1;

whereby said first, second and third means invert the sign of said-digit operand Y having non-positive digits other than-the most significant digit.

15. The arithmetic processing unit according to claim 14 wherein each of said first, second and third means are further coupled to receives a control signal and, depending upon-the value of said control signal, provide respective signal which represent digits of either the sign-inverted operand $-Y$ or digits of said operand Y, said arithmetic processing unit further including arithmetic means coupled to receive said signals derived from said first, second and third means and signals representing a signed-digit number X, said arithmetic means providing signals representative of the sum or difference of said numbers X and Y depending upon-the value of said control signal.

16. A divider for performing a shift-subtract/add restoring method of division utilizing radix r signed-digit operands having N+1 digits which may have positive or negative digit values, said divider comprising:
 (a) first means coupled to receive and signal representing a binary dividend X and to receive a signal representing a binary divisor Y, said first means providing a signal representing a partial remainder $R_1$ (i.e. $X-Y$) as a signed digit expression;

(b) second means coupled to receive a signal representing a partial remainder $R_1$ represented by a signed digit expression, said second means providing a signal representing a quotient digit $q_i$ as a signed digit expression, where i is an index which assumes integer values ranging from 1 to N;

(c) third means coupled to receive a signal representing said divisor Y and said signal representing said quotient digit $q_i$, said third means providing a signal representing a number $D_i$ having a value of Y, $-Y$ or 0 depending upon said quotient digit $q_i$, said number $D_i$ having non-negative digits other than the most significant digit, where i is an index that assumes integer values ranging from 1 to N;

(d) fourth means coupled to receive said signal representing said partial remainder $R_i$ and said signal representing said number $D_i$, said fourth means providing a signal representing a partial remainder $R_{i+1}$ as a signed digit expression; that is $R_i+D_i$; and (e) fifth means coupled to receive said signals representing quotient digits $q_i$ as signed digit expressions, said fifth means providing a signal representing the binary quotient of the division X/Y.

17. A divider for performing the shift-subtract/add restoring method of division utilizing radix 2 signed-digit operands having N+1 digits, each of which can assume a value 1, 0 and $-1$, said divider comprising:

(a) first means coupled to receive a signal representing a binary dividend X and to receive a signal representing a binary divisor Y, said first means providing a signal representing a partial remainder $R_1$ (i.e. $X-Y$) as a signed digit expression;

(b) second means coupled to receive a signal corresponding to the most significant three digits of a partial remainder $R_i$, represented by a signed digit expression, said second means providing a signal representing a quotient digit $q_i$ as a signed digit expression, where i is an index which assumes integer values ranging from 0 to N;

(c) third means coupled to receive said signal representing said divisor Y and said signal representing said quotient digit $q_i$ said third means providing a signal representing a number $D_i$ having a value of Y, $-Y$ or 0 depending upon said quotient digit $q_i$, said number $D_i$ having non-negative digits other than the most significant digit, where i is an index which assumes integer values ranging from 1 to N;

(d) fourth means coupled to receive said signal representing said partial remainder $R_i$ and said signal representing said number $D_i$, said fourth means providing a signal representing a partial remainder $R_{i+1}$ as a signed digit expression, and (e) fifth means coupled to receive said signals representing quotient digits $q_i$ as signed digit expressions, said fifth means providing a signal representing the binary quotient of the division X/Y.

18. The divider according to claim 17 wherein the stage of said fifth means which corresponds to the most significant digit of the quotient receives a constant signal corresponding to $q_0=1$.

19. The divider according to claim 17 wherein said third means provides 1-bit signals representing each digit of said number $D_i$, said number $D_i$ having non-negative digits other than the most significant digit, where i is an index which assumes integer values ranging from 1 to N.

20. The divider according to claim 17 wherein said third means receives a 2-bit signal representing the digit $y_i$ and the logical negation of digit $y_i$, for each digit $y_i$ of said divisor Y, where is an index which assumes integer values ranging from 1 to N.

21. The divider according to claim 17 which further includes an array structure comprising $N-1$ stages of said third and fourth means for determining each partial remainder $R_i$, where i is an index which assumes integer values ranging from 2 to N, and an array structure comprising N stages of said second means for determining each quotient digit $q^j$, where j is an index which assumes integer values ranging from 1 to N.

22. A divider for performing the shift-subtract/add restoring method of division utilizing radix 2 signed-digit operands having N+1 digits which have any of 1, 0 and $-1$ as a digit value, said divider comprising:

(a) first means coupled to receive signals representing a binary dividend X and signals representing a binary divisor Y, said first means providing a signal representing a partial remainder $R_1$ (i.e. $X-Y$) as a signed digit expression.

(b) a plurality of second means coupled to receive a signal corresponding to the most significant three digits of a partial remainder $R_i$ represented by a signed digit expression, said second means providing a signal representing a quotient digit $q_i$ as a signed digit expression, where i is an index which assumes integer values ranging from 1 to M and M<N;

(c) a plurality of third means arranged in M stages and coupled to receive said signals representing said divisor Y and said signals representing said quotient digit $q_i$, said third means providing a signal representing a number $D_i$ having a value of Y, $-Y$ or 0 depending upon said quotient digit qi, said number $D_i$ having non-negative digits other than the most significant digit, where i assumes integer values ranging from 1 to M;

(d) a plurality of fourth means arranged in M stages and coupled to receive said signal representing said partial remainder $R_i$ and said signal representing said number $D_i$, said fourth means providing a signal representing a partial remainder $R_{i+1}$ as a signed digit expression, where i is an index which assumes integer values ranging from 1 to M;

(e) remainder memory means having N+1 signed-digits each storing a signal representing each digit of said partial remainder $R_{i+1}$; and (f) selection means coupled to receive a signal deriving from said first means and a signal stored by said remainder memory means, said selection means providing an input signal to said second and third means, said input representing either a partial remainder $R_1$ or a partial remainder $R_{M+1}$; whereby the division of N+1 digit numbers is performed by M stages of said second, third and fourth means and said first, fifth, remainder memory and selection means.

23. The divider according to claim 22 further including quotient memory means capable of storing L×M signed-digits, each stored digit representing signals corresponding to each quotient digit $q_i$ derived from said second means, where L is an integer equal to or greater than (N/M−1).

* * * * *

UNITED STATES PATENT AND TRADEMARK OFFICE
CERTIFICATE OF CORRECTION

PATENT NO. : 4,866,655

DATED : September 12, 1989

INVENTOR(S) : Tamotsu Nishiyama, Shigeo Kuninobu, Naofumi Takaji and Takashi Taniguchi It is certified that error appears in the above-identified patent and that said Letters Patent is hereby corrected as shown below:

Title Page: The correct title should be "ARITHMETIC PROCESSOR AND DIVIDER USING REDUNDANT SIGNED DIGIT ARITHMETIC".

Col. 2, line 26 "Divider Using Redundant Signed Digit", It is another" should be "It is another"

Col. 3, line 42 "0" should be "0"

line 45 "0," should be "0"

Col. 5, line 36 "$\{w_{n-1}\bar{y}_{n-2}\text{---}\bar{y}_1\bar{y}_0\}_{SD2}+1$" should be "$\{w_{n-1}\bar{y}_{n-2}\text{---}\bar{y}_1\bar{y}_0\}_{SD2}+1$"

line 41 "$y_{n-1}0$" should be "$y_{n-1} = 0$"

Col. 6, line 26 "$(x_0 x_1 ... x_n)_{SD2}$" should be "$\{x_0.x_1\text{---}x_n\}_{SD2}$"

Col. 7, line 40 "$\{0\ x_1\ x_2\text{---},\ x_n\}_2$" should be "$\{0.x_1x_2\text{---}x_n\}_2$"

line 41 "$\{0y_1\ y_2\text{---},\ y_n\}_2$" should be "$\{0.y_1y_2\text{---}y_n\}_2$"

line 50 "$\{0\ z_1\ z_2\text{---},\ z_n\}_2$" should be "$\{0.z_1z_2\text{---}z_n\}_2$"

Col. 8, line 48 "$(0.y_1y_2...y_n)_2$" should be "$\{0.y_1y_2...y_n\}_2$"

line 51 "$(0.y_1y_2...y_n)_2$" should be "$\{0.y_1y_2...y_n\}_2$"

line 59 "$R^{(j)}$ and" should be "$R^{(j)}$ redundant addition of $r^j_{i+1}$ and"

UNITED STATES PATENT AND TRADEMARK OFFICE
CERTIFICATE OF CORRECTION

PATENT NO. : 4,866,655

DATED : September 12, 1989

INVENTOR(S) : Tamotsu Nishiyama, Shigeo Kuninobu, Naofumi Takaji and Takashi Taniguchi It is certified that error appears in the above-identified patent and that said Letters Patent is hereby corrected as shown below:

Col. 9, line 15 " $d_i = q_+^j + y_i + q_-^j y$ " should be " $d_i = q_+^j y_i + q_-^j y_i$ "

line 19 " $\overline{r_{i+1}^j} + \overline{r_{i+1a}^j} \cdot d_i^j$ " should be " $\overline{r_{i+1s}^j} + \overline{r_{i+1a}^j} \cdot d_i^j$ "

line 32 " $r_n^j{}^{-1} = \overline{q}^j + \overline{Y}_n$ " should be " $r_{ns}^{j'} = \overline{q^j} + \overline{y_n}$ "

line 45 "37" should be ""

Col. 10, line 1 "$(\overline{d_i}^{-j})$" should be "$(\overline{d_i^j})$"

line 5 "$(\overline{S_i}^{-j})$" should be "$(\overline{S_i^j})$"

line 23 "$\overline{S_i}^{-j}$" should be "$\overline{S_i^j}$"

Col. 11, line 44 "$\overline{r_{0s}^j} + \overline{r_{0a}^j} \cdot \overline{r_{1s}^j} + \overline{r_{0a}^j} \cdot \overline{r_{2s}^j}$; and" should be "$q_+^j = \overline{r_{0s}^j} + \overline{r_{0a}^j} \cdot \overline{r_{1s}^j} + \overline{r_{0a}^j} \cdot \overline{r_{1a}^j} \cdot \overline{r_{2s}^j}$"

line 45 "$(r_{0a}^j \ r_{1a}^j + r_{2a}^j)$" should be "$(r_{0a}^j + r_{1a}^j + r_{2a}^j)$"

Col. 12, line 6 "in-the" should be "in the"

line 55 "ly =" should be "Y ="

UNITED STATES PATENT AND TRADEMARK OFFICE
CERTIFICATE OF CORRECTION

PATENT NO. : 4,866,655

DATED : September 12, 1989

INVENTOR(S) : Tamotsu Nishiyama, Shigeo Kuninobu, Naofumi Takaji and Takashi Taniguchi It is certified that error appears in the above-identified patent and that said Letters Patent is hereby corrected as shown below:

Col. 12, line 55  "31 1" should be removed from this sentence.

line 62  "y =" should be "Y ="

Col. 13, line 8  "$(1\ \bar{y}_{n-2} \cdots \bar{y}_1\ \bar{y}_0) s_{D2} + 1.$"  should be  "$\{\bar{1}\ \bar{y}_{n-2} — \bar{y}_1 \bar{y}_0\}_{sD2+1}$"

line 34  "$-y = \{0\ \bar{y}_{n-2} \cdots \bar{y}_1\ \bar{y}_0\} s_{D2} \cdot 1.$"  should be  "$-y = \{0\ \bar{y}_{n-2} — \bar{y}_1 \bar{y}_0\}_{sD2+1}$"

line 50  "$(\quad)_{SD2}$" should be "$\{\quad\}_{SD2}$"

line 52  "$(\quad)_2$" should be "$\{\quad\}_2$"

line 55  "$(\quad)_{SD2}$" should be "$\{\quad\}_{SD2}$"

line 57  "$(\quad)_2$" should be "$\{\quad\}_2$"

line 59  "$(\quad)_{SD2}$" should be "$\{\quad\}_{SD2}$"

Col. 14, line 23  "$z_i = s_i + \bar{c}_{i-1};$ and"  should be  "$z_i^s = s_i + \bar{c}_{i-1};$"

line 37  "$z_0^s = (y_0 x_0^s)(\bar{y}_0 + \bar{x}_0^s + x_0^s);$"  should be  "$z_0^s = (y_0 + x_0^s)(\bar{y}_0 + \bar{x}_0^s + x_0^s)$"

line 48  "$\bar{x}_i$-$s$"  should be  "$\bar{x}_1\,s$"

UNITED STATES PATENT AND TRADEMARK OFFICE
CERTIFICATE OF CORRECTION

PATENT NO. : 4,866,655

DATED : September 12, 1989

INVENTOR(S) : Tamotsu Nishiyama, Shigeo Kuninobu, Naofumi Takaji and Takashi Taniguchi It is certified that error appears in the above-identified patent and that said Letters Patent is hereby corrected as shown below:

Col. 15, line 29  "$d_i = \overline{Y_i}$" should be "$d_i = \overline{y_i}$"

line 41  "(dn-1)"  should be  "$(d_{n-1})$"

"$(Z^a_{n-1})$"  should be  "$(z^a_{n-1})$"

line 42  "$Y_i$" should be "$y_i$"

line 52  "negotiation"  should be  "negation"

Col. 16, line 25  "$y_o + 1$" should be "$\overline{y_o} + 1$"

line 29  "$y_o + 1$" should be "$\overline{y_o} + 1$"

line 45  "$y = 0$" should be "$y_o = 0$"

line 58  "$\{0 \cdot x_1 x_2 \text{---} x_n\}_2$" should be "$\{0.x_1 x_2 \text{---} x_n\}_2$"

line 59  "$\{0 \cdot y_1 y_2 \text{---} y_n\}_2$" should be "$\{0.y_1 y_2 \text{---} y_n\}_2$"

UNITED STATES PATENT AND TRADEMARK OFFICE
CERTIFICATE OF CORRECTION

PATENT NO. : 4,866,655

DATED : September 12, 1989

INVENTOR(S) : Tamotsu Nishiyama, Shigeo Kuninobu, Naofumi Takaji and Takashi Taniguchi It is certified that error appears in the above-identified patent and that said Letters Patent is hereby corrected as shown below:

Col. 16, line 67  "$\{0.z_1 2_2 \text{---} z_n\}_2$"  should be  "$\{0.z_1 z_2 \text{---} z_n\}_2$"

Signed and Sealed this

Sixth Day of October, 1992

*Attest:*

DOUGLAS B. COMER

*Attesting Officer*  Acting Commissioner of Patents and Trademarks